(12) United States Patent
Park et al.

(10) Patent No.: US 12,395,679 B2
(45) Date of Patent: Aug. 19, 2025

(54) POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

(71) Applicant: LG Electronics Inc., Seoul (KR)

(72) Inventors: Yousun Park, Seoul (KR); Hyejung Hur, Seoul (KR)

(73) Assignee: LG Electronics Inc., Seoul (KR)

( * ) Notice: Subject to any disclaimer, the term of this patent is extended or adjusted under 35 U.S.C. 154(b) by 29 days.

(21) Appl. No.: 17/716,654

(22) Filed: Apr. 8, 2022

(65) Prior Publication Data

US 2022/0337872 A1    Oct. 20, 2022

(30) Foreign Application Priority Data

Apr. 15, 2021  (KR) .................. 10-2021-0048927

(51) Int. Cl.
| | |
|---|---|
| *H04N 19/597* | (2014.01) |
| *G06T 9/00* | (2006.01) |
| *H04N 19/105* | (2014.01) |
| *H04N 19/172* | (2014.01) |
| *H04N 19/70* | (2014.01) |

(52) U.S. Cl.
CPC ......... *H04N 19/597* (2014.11); *H04N 19/105* (2014.11); *H04N 19/172* (2014.11); *H04N 19/70* (2014.11)

(58) Field of Classification Search
CPC ........... G06T 9/001; G06T 9/005; G06T 9/40; G06T 9/00; H04N 19/105; H04N 19/172; H04N 19/597; H04N 19/70; H04N 19/96; H04N 19/157; H04N 19/13
See application file for complete search history.

(56) References Cited

U.S. PATENT DOCUMENTS

| | | | | |
|---|---|---|---|---|
| 10,904,476 | B1 * | 1/2021 | Siagian | G06V 20/49 |
| 11,284,111 | B2 * | 3/2022 | Yea | H04N 19/61 |
| 11,328,440 | B2 * | 5/2022 | Hur | G06T 7/60 |
| 11,625,866 | B2 * | 4/2023 | Flynn | H04N 19/46 |
| | | | | 382/240 |
| 11,688,104 | B2 * | 6/2023 | Zakharchenko | H04N 7/18 |
| | | | | 375/240.16 |
| 11,830,212 | B2 * | 11/2023 | Hur | G06T 9/001 |
| 2007/0236579 | A1 | 10/2007 | Li et al. | |

(Continued)

FOREIGN PATENT DOCUMENTS

| | | |
|---|---|---|
| WO | WO2020189982 | 9/2020 |
| WO | WO2020101021 | 10/2021 |

OTHER PUBLICATIONS

_An overview of ongoing point cloud compression standardization for video-based V-PCC and geometry-based G-PCC-2020; (Year: 2020).*

(Continued)

*Primary Examiner* — Luis Perez-Fuentes
(74) *Attorney, Agent, or Firm* — Fish & Richardson P.C.

(57) ABSTRACT

Disclosed herein is a method for receiving point cloud data, including receiving a bitstream containing the point cloud data, and decoding the point cloud data. Disclosed herein is a method for transmitting point cloud data, including encoding the point cloud data, and transmitting a bitstream containing the point cloud data.

16 Claims, 30 Drawing Sheets

(56) References Cited

U.S. PATENT DOCUMENTS

| | | | |
|---|---|---|---|
| 2008/0218390 A1* | 9/2008 | Kim | H03M 7/40 |
| | | | 341/107 |
| 2016/0353113 A1* | 12/2016 | Zhang | H04N 19/625 |
| 2019/0052883 A1* | 2/2019 | Ikeda | H03M 7/6005 |
| 2019/0089961 A1* | 3/2019 | Ahn | H04N 19/593 |
| 2019/0387251 A1* | 12/2019 | Lin | H04N 19/105 |
| 2020/0258262 A1 | 8/2020 | Lasserre et al. | |
| 2020/0304823 A1 | 9/2020 | Yea et al. | |
| 2020/0336737 A1* | 10/2020 | Ye | H04N 19/124 |
| 2021/0217202 A1* | 7/2021 | Zakharchenko | H04N 19/597 |
| 2022/0224940 A1* | 7/2022 | Hur | H04N 19/119 |

OTHER PUBLICATIONS

_G-PCC coding description ver. 2; Mammou—LG—Jan. 2019; (Year: 2019).*

International Search Report in International Appln. No. PCT/KR2022/001827, dated May 26, 2022, 9 pages.

WG 7 & MPEG 3D Graphics Coding, "G-PCC codec description," 19620, ISO/IEC JTC 1/SC 29/WG 7 N0011, Oct. 2020, Virtual, 148 pages.

Extended European Search Report in European Appln. No. 22788240.4, mailed on Feb. 24, 2025, 10 pages.

Glantz et al., "Adaptive Global Motion Temporal Prediction for Video Coding," Paper, Presented at the 28th Picture Coding Symposium, PCS2010, Nagoya, Japan, Dec. 8-10, 2010, pp. 202-205.

Lasserre et al., "m56271—The (early) history of the GPCC ETM," Motion Picture Expert Group of ISO/IEC JTC1/SC29/WG11, Jan. 11-15, 2021, 30 pages.

Mekuria et al., "Design, Implementation, and Evaluation of a Point Cloud Codec for Tele-Immersive Video," IEEE Transactions on Circuits and Systems for Video Technology, Apr. 2017, 27(2):828-842.

Xu et al., "Predictive Generalized Graph Fourier Transform for Attribute Compression of Dynamic Point Clouds," IEEE Transactionson Circuits and Systems for Video Technology, May 2021, 31(5):1968-1982.

* cited by examiner

FIG. 7
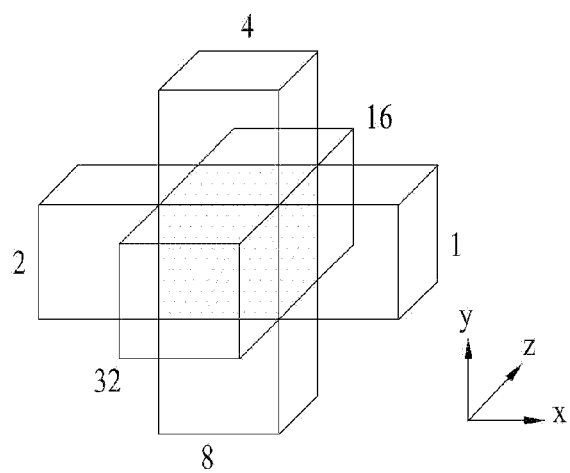
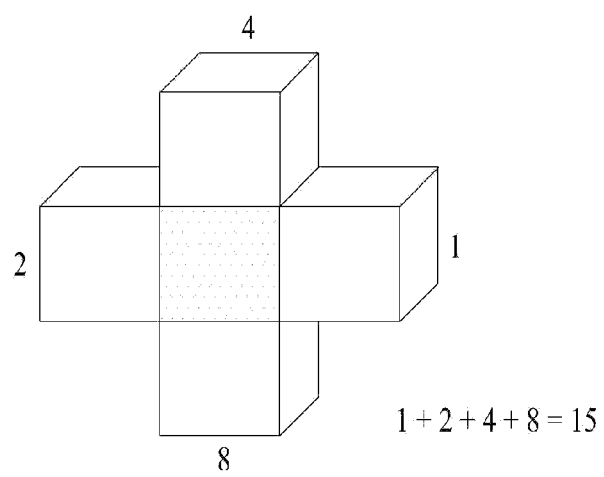
$1 + 2 + 4 + 8 = 15$

FIG. 21

| C2_ai - lossy geometry, lossy attributes | | | | | | | | | | | | | | |
|---|---|---|---|---|---|---|---|---|---|---|---|---|---|---|
| | | | Geom. BD-TotGeomRate | | End-to-End BD-AttrRate [%] | | | | | Geom. BD-TotalRate | | End-to-End BD-TotalRate [%] | | |
| Class | Sequence | | D1 | D2 | Luma | Chroma Cb | Chroma Cr | Reflectance | | D1 | D2 | Luma | Chroma Cb | Chroma Cr | Reflectance |
| cat3-frame | ford_01_q1mm | | -1.4% | -1.4% | | | | 0.0% | | -1.3% | -1.3% | | | | -1.1% |
| | ford_02_q1mm | | -1.5% | -1.5% | | | | 0.0% | | -1.4% | -1.4% | | | | -1.1% |
| | ford_03_q1mm | | -1.1% | -1.1% | | | | 0.0% | | -1.0% | -1.0% | | | | -0.8% |
| | qnxadas-junction-approach | | -3.8% | -3.8% | | | | 0.0% | | -3.7% | -3.6% | | | | -3.4% |
| | qnxadas-junction-exit | | -4.0% | -4.0% | | | | 0.0% | | -3.9% | -3.8% | | | | -3.7% |
| | qnxadas-motorway-join | | -2.5% | -2.4% | | | | 0.0% | | -2.4% | -2.4% | | | | -2.2% |
| | qnxadas-navigating-bends | | -2.8% | -2.7% | | | | 0.0% | | -2.7% | -2.6% | | | | -2.3% |
| | Cat3-frame average | | -2.5% | -2.4% | | | | 0.0% | | -2.3% | -2.3% | | | | -2.1% |
| | Overall average | | -2.5% | -2.4% | #DIV/0! | #DIV/0! | #DIV/0! | 0.0% | | -2.3% | -2.3% | #DIV/0! | #DIV/0! | #DIV/0! | -2.1% |

Table 1 Results for C2-lossy geometry coding (all frames)

FIG. 22

| C2_ai - lossy geometry, lossy attributes | | | | | | | |
|---|---|---|---|---|---|---|---|
| | | Geom. BD-TotGeomRate | | End-to-End BD-AttrRate [%] | | | |
| Class | Sequence | D1 | D2 | Luma | Chroma Cb | Chroma Cr | Reflectance |
| cat3-frame | ford_01_q1mm | 99.8% | 99.8% | | | | 100.0% |
| | ford_02_q1mm | 99.8% | 99.8% | | | | 100.0% |
| | ford_03_q1mm | 99.8% | 99.8% | | | | 100.0% |
| | qnxadas-junction-approach | 99.5% | 99.4% | | | | 100.0% |
| | qnxadas-junction-exit | 99.6% | 99.4% | | | | 100.0% |
| | qnxadas-motorway-join | 99.6% | 99.6% | | | | 100.0% |
| | qnxadas-navigating-bends | 99.6% | 99.5% | | | | 100.0% |
| | Cat3-frame average | 99.7% | 99.6% | #DIV/0! | #DIV/0! | #DIV/0! | 100.0% |
| | Overall average | 99.7% | 99.6% | #DIV/0! | #DIV/0! | #DIV/0! | 100.0% |

Table 2 Results for CW-lossless geometry coding (all frames)

FIG. 24

| sequence_parameter_set( ) { | Descriptor |
|---|---|
| ... | |
| frameIdx | ue(v) |
| context_continue_flag | u(1) |
| if(context_continue_flag) | |
|     context_continue_use_frameIdx | ue(v) |
| ... | |
| byte_alignment( ) | |
| } | |

FIG. 25

| tile_parameter_set( ) { | Descriptor |
|---|---|
| ... | ue(v) |
| tile_ctr | ue(v) |
| tile_context_continue_flag | u(1) |
| if(tile_context_continue_flag) | |
|     tile_context_continue_use_tileIdx | ue(v) |
| ... | |
| } | |

FIG. 26

| geometry_parameter_set( ) { | Descriptor |
|---|---|
| ... | |
| frameIdx | ue(v) |
| geomtry_context_continue_flag | u(1) |
| if(geometry_context_continue_flag) | |
|     geometry_context_continue_use_frameIdx | ue(v) |
| ... | |
| } | |

FIG. 27

| attribute_parameter_set( ) { | Descriptor |
|---|---|
| ... | |
| frameIdx | ue(v) |
| attribute_context_continue_flag | u(1) |
| if(attribute_context_continue_flag) | |
|     attribute_context_continue_use_frameIdx | ue(v) |
| ... | |
| } | |

FIG. 28

| geometry_slice_header( ) { | Descriptor |
|---|---|
| ... | |
| gsh_slice_id | ue(v) |
| geometry_slice_context_continue_flag | u(1) |
| if(geometry_slice_context_continue_flag) | |
| geometry_slice_context_continue_use_sliceIdx | ue(v) |
| ... | |
| } | |

POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

CROSS-REFERENCE TO RELATED APPLICATIONS

This application claims the benefit of Korean Patent Application No. 10-2021-0048927, filed on Apr. 15, 2021, which is hereby incorporated by reference as if fully set forth herein.

BACKGROUND OF THE DISCLOSURE

Field of the Disclosure

Embodiments relate to a method and apparatus for processing point cloud content.

Discussion of the Related Art

Point cloud content is content represented by a point cloud, which is a set of points belonging to a coordinate system representing a three-dimensional space. The point cloud content may express media configured in three dimensions, and is used to provide various services such as virtual reality (VR), augmented reality (AR), mixed reality (MR), and self-driving services. However, tens of thousands to hundreds of thousands of point data are required to represent point cloud content. Therefore, there is a need for a method for efficiently processing a large amount of point data.

SUMMARY OF THE DISCLOSURE

Embodiments provide an apparatus and method for efficiently processing point cloud data. Embodiments provide a point cloud data processing method and apparatus for addressing latency and encoding/decoding complexity.

The technical scope of the embodiments is not limited to the aforementioned technical objects, and may be extended to other technical objects that may be inferred by those skilled in the art based on the entire contents disclosed herein.

To achieve these objects and other advantages and in accordance with the purpose of the disclosure, as embodied and broadly described herein, a method of transmitting point cloud data may include encoding point cloud data, and transmitting a bitstream including the point cloud data. In another aspect of the present disclosure, a method of receiving point cloud data may include receiving a bitstream including point cloud data, and decoding the point cloud data.

Apparatuses and methods according to embodiments may process point cloud data with high efficiency.

The apparatuses and methods according to the embodiments may provide a high-quality point cloud service.

The apparatuses and methods according to the embodiments may provide point cloud content for providing general-purpose services such as a VR service and a self-driving service.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. For a better understanding of various embodiments described below, reference should be made to the description of the following embodiments in connection with the accompanying drawings. The same reference numbers will be used throughout the drawings to refer to the same or like parts. In the drawings:

FIG. 7 shows an example of a neighbor node pattern according to embodiments;

FIG. 21 shows efficiency of encoding of point cloud data according to embodiments;

FIG. 22 shows efficiency of encoding of point cloud data according to embodiments;

FIG. 24 shows an example of syntax of a sequence parameter set according to embodiments;

FIG. 25 shows an example of syntax of a tile parameter set according to embodiments;

FIG. 26 shows an example of syntax of a geometry parameter set according to embodiments;

FIG. 27 shows an example of syntax of an attribute parameter set according to embodiments;

FIG. 28 shows an example of syntax of a slice header of a geometry bitstream according to embodiments;

DETAILED DESCRIPTION OF THE DISCLOSURE

Best Mode

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that may be implemented according to the present disclosure. The following detailed description includes specific details in order to provide a thorough understanding of the present disclosure. However, it will be apparent to those skilled in the art that the present disclosure may be practiced without such specific details.

Although most terms used in the present disclosure have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings.

Figure 1:
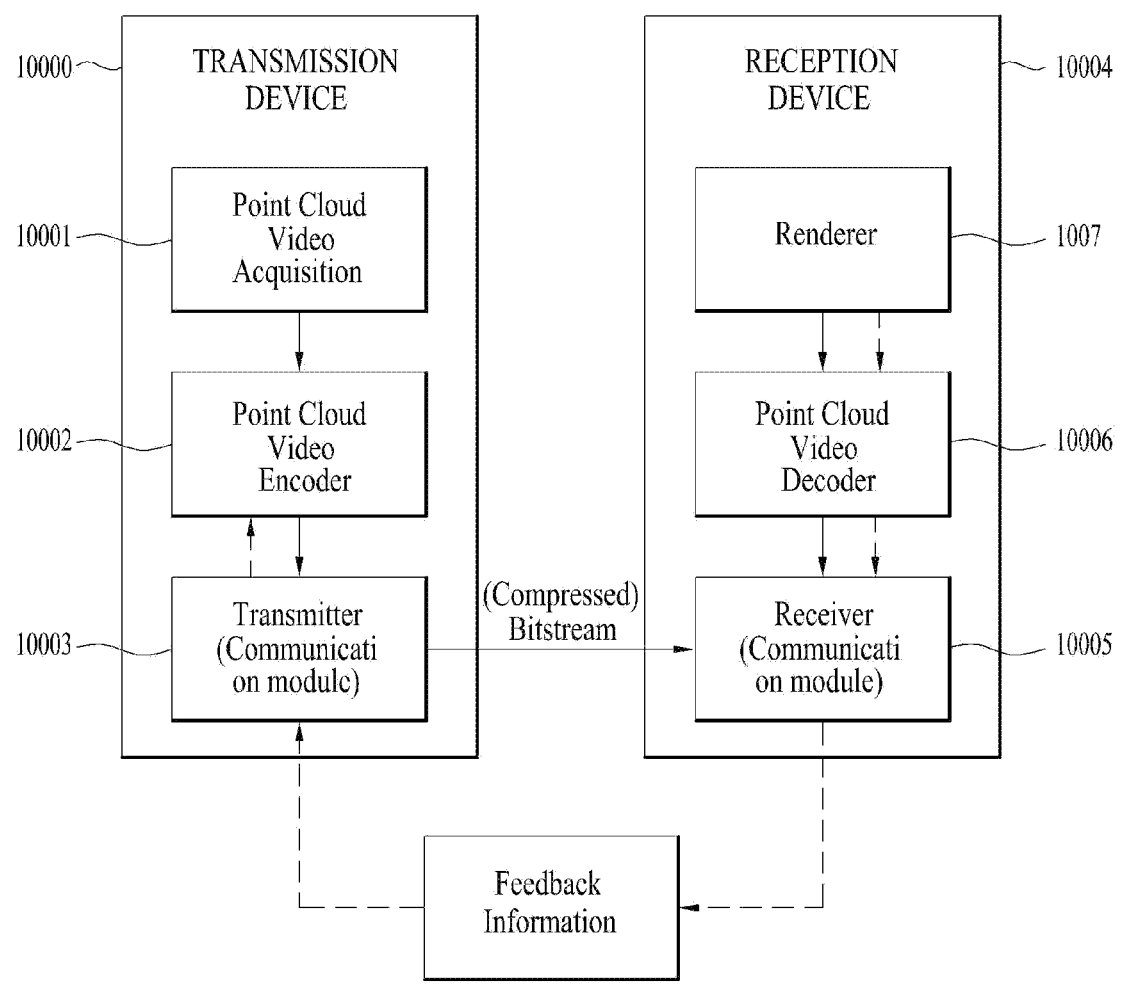
FIG. 1 shows an exemplary point cloud content providing system according to embodiments.

FIG. 1 shows an exemplary point cloud content providing system according to embodiments.

The point cloud content providing system illustrated in FIG. 1 may include a transmission device 10000 and a reception device 10004. The transmission device 10000 and the reception device 10004 are capable of wired or wireless communication to transmit and receive point cloud data.

The point cloud data transmission device 10000 according to the embodiments may secure and process point cloud video (or point cloud content) and transmit the same. According to embodiments, the transmission device 10000 may include a fixed station, a base transceiver system (BTS), a network, an artificial intelligence (AI) device and/or system, a robot, an AR/VR/XR device and/or server. According to embodiments, the transmission device 10000 may include a device, a robot, a vehicle, an AR/VR/XR device, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The transmission device 10000 according to the embodiments includes a point cloud video acquirer 10001, a point cloud video encoder 10002, and/or a transmitter (or communication module) 10003.

The point cloud video acquirer 10001 according to the embodiments acquires a point cloud video through a processing process such as capture, synthesis, or generation. The point cloud video is point cloud content represented by a point cloud, which is a set of points positioned in a 3D space, and may be referred to as point cloud video data. The point cloud video according to the embodiments may include one or more frames. One frame represents a still image/picture. Therefore, the point cloud video may include a point cloud image/frame/picture, and may be referred to as a point cloud image, frame, or picture.

The point cloud video encoder 10002 according to the embodiments encodes the acquired point cloud video data. The point cloud video encoder 10002 may encode the point cloud video data based on point cloud compression coding. The point cloud compression coding according to the embodiments may include geometry-based point cloud compression (G-PCC) coding and/or video-based point cloud compression (V-PCC) coding or next-generation coding. The point cloud compression coding according to the embodiments is not limited to the above-described embodiment. The point cloud video encoder 10002 may output a bitstream containing the encoded point cloud video data. The bitstream may contain not only the encoded point cloud video data, but also signaling information related to encoding of the point cloud video data.

The transmitter 10003 according to the embodiments transmits the bitstream containing the encoded point cloud video data. The bitstream according to the embodiments is encapsulated in a file or segment (for example, a streaming segment), and is transmitted over various networks such as a broadcasting network and/or a broadband network. Although not shown in the figure, the transmission device 10000 may include an encapsulator (or an encapsulation module) configured to perform an encapsulation operation. According to embodiments, the encapsulator may be included in the transmitter 10003. According to embodiments, the file or segment may be transmitted to the reception device 10004 over a network, or stored in a digital storage medium (e.g., USB, SD, CD, DVD, Blu-ray, HDD, SSD, etc.). The transmitter 10003 according to the embodiments is capable of wired/wireless communication with the reception device 10004 (or the receiver 10005) over a network of 4G, 5G, 6G, etc. In addition, the transmitter may perform a necessary data processing operation according to the network system (e.g., a 4G, 5G or 6G communication network system). The transmission device 10000 may transmit the encapsulated data in an on-demand manner.

The reception device 10004 according to the embodiments includes a receiver 10005, a point cloud video decoder 10006, and/or a renderer 10007. According to embodiments, the reception device 10004 may include a device, a robot, a vehicle, an AR/VR/XR device, a portable device, a home appliance, an Internet of Things (IoT) device, and an AI device/server which are configured to perform communication with a base station and/or other wireless devices using a radio access technology (e.g., 5G New RAT (NR), Long Term Evolution (LTE)).

The receiver 10005 according to the embodiments receives the bitstream containing the point cloud video data or the file/segment in which the bitstream is encapsulated from the network or storage medium. The receiver 10005 may perform necessary data processing according to the network system (for example, a communication network system of 4G, 5G, 6G, etc.). The receiver 10005 according to the embodiments may decapsulate the received file/segment and output a bitstream. According to embodiments, the receiver 10005 may include a decapsulator (or a decapsulation module) configured to perform a decapsulation operation. The decapsulator may be implemented as an element (or component) separate from the receiver 10005.

The point cloud video decoder 10006 decodes the bitstream containing the point cloud video data. The point cloud video decoder 10006 may decode the point cloud video data according to the method by which the point cloud video data is encoded (for example, in a reverse process of the operation of the point cloud video encoder 10002). Accordingly, the point cloud video decoder 10006 may decode the point cloud video data by performing point cloud decompression coding, which is the inverse process of the point cloud compression. The point cloud decompression coding includes G-PCC coding.

The renderer 10007 renders the decoded point cloud video data. The renderer 10007 may output point cloud content by rendering not only the point cloud video data but also audio data. According to embodiments, the renderer 10007 may include a display configured to display the point cloud content. According to embodiments, the display may be implemented as a separate device or component rather than being included in the renderer 10007.

The arrows indicated by dotted lines in the drawing represent a transmission path of feedback information acquired by the reception device 10004. The feedback information is information for reflecting interactivity with a user who consumes the point cloud content, and includes information about the user (e.g., head orientation information, viewport information, and the like). In particular, when the point cloud content is content for a service (e.g., self-driving service, etc.) that requires interaction with the user, the feedback information may be provided to the content transmitting side (e.g., the transmission device 10000) and/or the service provider. According to embodiments, the feedback information may be used in the reception device 10004 as well as the transmission device 10000, or may not be provided.

The head orientation information according to embodiments is information about the user's head position, orientation, angle, motion, and the like. The reception device 10004 according to the embodiments may calculate the viewport information based on the head orientation information. The viewport information may be information about a region of a point cloud video that the user is viewing. A viewpoint is a point through which the user is viewing the point cloud video, and may refer to a center point of the viewport region. That is, the viewport is a region centered on the viewpoint, and the size and shape of the region may be determined by a field of view (FOV). Accordingly, the reception device 10004 may extract the viewport information based on a vertical or horizontal FOV supported by the device in addition to the head orientation information. Also, the reception device 10004 performs gaze analysis or the like to check the way the user consumes a point cloud, a region that the user gazes at in the point cloud video, a gaze time, and the like. According to embodiments, the reception device 10004 may transmit feedback information including the result of the gaze analysis to the transmission device 10000. The feedback information according to the embodiments may be acquired in the rendering and/or display process. The feedback information according to the embodiments may be secured by one or more sensors included in the reception device 10004. According to embodiments, the feedback information may be secured by the renderer 10007 or a separate external element (or device, component, or the like). The dotted lines in FIG. 1 represent a process of transmitting the feedback information secured by the renderer 10007. The point cloud content providing system may process (encode/decode) point cloud data based on the feedback information. Accordingly, the point cloud video data decoder 10006 may perform a decoding operation based on the feedback information. The reception device 10004 may transmit the feedback information to the transmission device 10000. The transmission device 10000 (or the point cloud video data encoder 10002) may perform an encoding operation based on the feedback information. Accordingly, the point cloud content providing system may efficiently process necessary data (e.g., point cloud data corresponding to the user's head position) based on the feedback information rather than processing (encoding/decoding) the entire point cloud data, and provide point cloud content to the user.

According to embodiments, the transmission device 10000 may be called an encoder, a transmission device, a transmitter, or the like, and the reception device 10004 may be called a decoder, a receiving device, a receiver, or the like.

The point cloud data processed in the point cloud content providing system of FIG. 1 according to embodiments (through a series of processes of acquisition/encoding/transmission/decoding/rendering) may be referred to as point cloud content data or point cloud video data. According to embodiments, the point cloud content data may be used as a concept covering metadata or signaling information related to the point cloud data.

The elements of the point cloud content providing system illustrated in FIG. 1 may be implemented by hardware, software, a processor, and/or a combination thereof.

Figure 2:
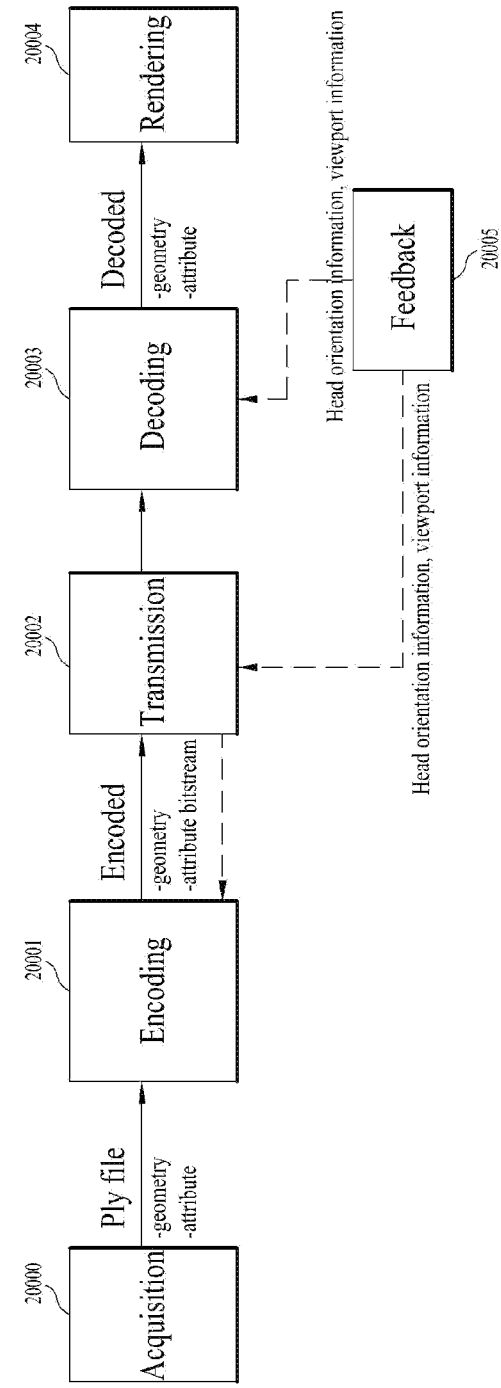
FIG. 2 is a block diagram illustrating a point cloud content providing operation according to embodiments.

FIG. 2 is a block diagram illustrating a point cloud content providing operation according to embodiments.

The block diagram of FIG. 2 shows the operation of the point cloud content providing system described in FIG. 1. As described above, the point cloud content providing system may process point cloud data based on point cloud compression coding (e.g., G-PCC).

The point cloud content providing system according to the embodiments (for example, the point cloud transmission device 10000 or the point cloud video acquirer 10001) may acquire a point cloud video (20000). The point cloud video is represented by a point cloud belonging to a coordinate system for expressing a 3D space. The point cloud video according to the embodiments may include a Ply (Polygon File format or the Stanford Triangle format) file. When the point cloud video has one or more frames, the acquired point cloud video may include one or more Ply files. The Ply files contain point cloud data, such as point geometry and/or attributes. The geometry includes positions of points. The position of each point may be represented by parameters (for example, values of the X, Y, and Z axes) representing a three-dimensional coordinate system (e.g., a coordinate system composed of X, Y and Z axes). The attributes include attributes of points (e.g., information about texture, color (in YCbCr or RGB), reflectance r, transparency, etc. of each point). A point has one or more attributes. For example, a point may have an attribute that is a color, or two attributes that are color and reflectance. According to embodiments, the geometry may be called positions, geometry information, geometry data, or the like, and the attribute may be called attributes, attribute information, attribute data, or the like. The point cloud content providing system (for example, the point cloud transmission device 10000 or the point cloud video acquirer 10001) may secure point cloud data from information (e.g., depth information, color information, etc.) related to the acquisition process of the point cloud video.

The point cloud content providing system (for example, the transmission device 10000 or the point cloud video encoder 10002) according to the embodiments may encode the point cloud data (20001). The point cloud content providing system may encode the point cloud data based on point cloud compression coding. As described above, the point cloud data may include the geometry and attributes of a point. Accordingly, the point cloud content providing system may perform geometry encoding of encoding the geometry and output a geometry bitstream. The point cloud content providing system may perform attribute encoding of encoding attributes and output an attribute bitstream. According to embodiments, the point cloud content providing system may perform the attribute encoding based on the geometry encoding. The geometry bitstream and the attribute bitstream according to the embodiments may be multiplexed and output as one bitstream. The bitstream according to the embodiments may further contain signaling information related to the geometry encoding and attribute encoding.

The point cloud content providing system (for example, the transmission device 10000 or the transmitter 10003) according to the embodiments may transmit the encoded point cloud data (20002). As illustrated in FIG. 1, the encoded point cloud data may be represented by a geometry bitstream and an attribute bitstream. In addition, the encoded point cloud data may be transmitted in the form of a bitstream together with signaling information related to encoding of the point cloud data (for example, signaling information related to the geometry encoding and the attribute encoding). The point cloud content providing system may encapsulate a bitstream that carries the encoded point cloud data and transmit the same in the form of a file or segment.

The point cloud content providing system (for example, the reception device 10004 or the receiver 10005) according to the embodiments may receive the bitstream containing the encoded point cloud data. In addition, the point cloud content providing system (for example, the reception device 10004 or the receiver 10005) may demultiplex the bitstream.

The point cloud content providing system (e.g., the reception device 10004 or the point cloud video decoder 10005) may decode the encoded point cloud data (e.g., the geometry bitstream, the attribute bitstream) transmitted in the bitstream. The point cloud content providing system (for example, the reception device 10004 or the point cloud video decoder 10005) may decode the point cloud video data based on the signaling information related to encoding of the point cloud video data contained in the bitstream. The point cloud content providing system (for example, the reception device 10004 or the point cloud video decoder 10005) may decode the geometry bitstream to reconstruct the positions (geometry) of points. The point cloud content providing system may reconstruct the attributes of the points by decoding the attribute bitstream based on the reconstructed geometry. The point cloud content providing system (for example, the reception device 10004 or the point cloud video decoder 10005) may reconstruct the point cloud video based on the positions according to the reconstructed geometry and the decoded attributes.

The point cloud content providing system according to the embodiments (for example, the reception device 10004 or the renderer 10007) may render the decoded point cloud data (20004). The point cloud content providing system (for example, the reception device 10004 or the renderer 10007) may render the geometry and attributes decoded through the decoding process, using various rendering methods. Points in the point cloud content may be rendered to a vertex having a certain thickness, a cube having a specific minimum size centered on the corresponding vertex position, or a circle centered on the corresponding vertex position. All or part of the rendered point cloud content is provided to the user through a display (e.g., a VR/AR display, a general display, etc.).

The point cloud content providing system (for example, the reception device 10004) according to the embodiments may secure feedback information (20005). The point cloud content providing system may encode and/or decode point cloud data based on the feedback information. The feedback information and the operation of the point cloud content providing system according to the embodiments are the same as the feedback information and the operation described with reference to FIG. 1, and thus detailed description thereof is omitted.

Figure 3:
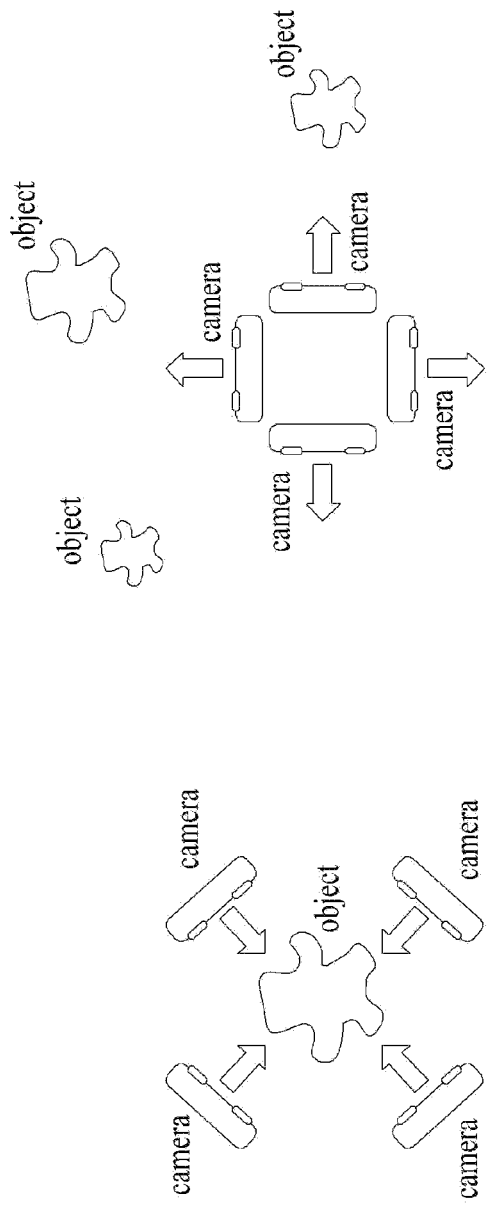
FIG. 3 illustrates an exemplary process of capturing a point cloud video according to embodiments.

FIG. 3 illustrates an exemplary process of capturing a point cloud video according to embodiments.

FIG. 3 illustrates an exemplary point cloud video capture process of the point cloud content providing system described with reference to FIGS. 1 to 2.

Point cloud content includes a point cloud video (images and/or videos) representing an object and/or environment located in various 3D spaces (e.g., a 3D space representing a real environment, a 3D space representing a virtual environment, etc.). Accordingly, the point cloud content providing system according to the embodiments may capture a point cloud video using one or more cameras (e.g., an infrared camera capable of securing depth information, an RGB camera capable of extracting color information corresponding to the depth information, etc.), a projector (e.g., an infrared pattern projector to secure depth information), a LiDAR, or the like. The point cloud content providing system according to the embodiments may extract the shape of geometry composed of points in a 3D space from the depth information and extract the attributes of each point from the color information to secure point cloud data. An image and/or video according to the embodiments may be captured based on at least one of the inward-facing technique and the outward-facing technique.

The left part of FIG. 3 illustrates the inward-facing technique. The inward-facing technique refers to a technique of capturing images a central object with one or more cameras (or camera sensors) positioned around the central object. The inward-facing technique may be used to generate point cloud content providing a 360-degree image of a key object to the user (e.g., VR/AR content providing a 360-degree image of an object (e.g., a key object such as a character, player, object, or actor) to the user).

The right part of FIG. 3 illustrates the outward-facing technique. The outward-facing technique refers to a technique of capturing images an environment of a central object rather than the central object with one or more cameras (or camera sensors) positioned around the central object. The outward-facing technique may be used to generate point cloud content for providing a surrounding environment that appears from the user's point of view (e.g., content representing an external environment that may be provided to a user of a self-driving vehicle).

As shown in the figure, the point cloud content may be generated based on the capturing operation of one or more cameras. In this case, the coordinate system may differ among the cameras, and accordingly the point cloud content providing system may calibrate one or more cameras to set a global coordinate system before the capturing operation. In addition, the point cloud content providing system may generate point cloud content by synthesizing an arbitrary image and/or video with an image and/or video captured by the above-described capture technique. The point cloud content providing system may not perform the capturing operation described in FIG. 3 when it generates point cloud content representing a virtual space. The point cloud content providing system according to the embodiments may perform post-processing on the captured image and/or video. In other words, the point cloud content providing system may remove an unwanted area (for example, a background), recognize a space to which the captured images and/or videos are connected, and, when there is a spatial hole, perform an operation of filling the spatial hole.

The point cloud content providing system may generate one piece of point cloud content by performing coordinate transformation on points of the point cloud video secured from each camera. The point cloud content providing system may perform coordinate transformation on the points based on the coordinates of the position of each camera. Accordingly, the point cloud content providing system may generate content representing one wide range, or may generate point cloud content having a high density of points.

Figure 4:
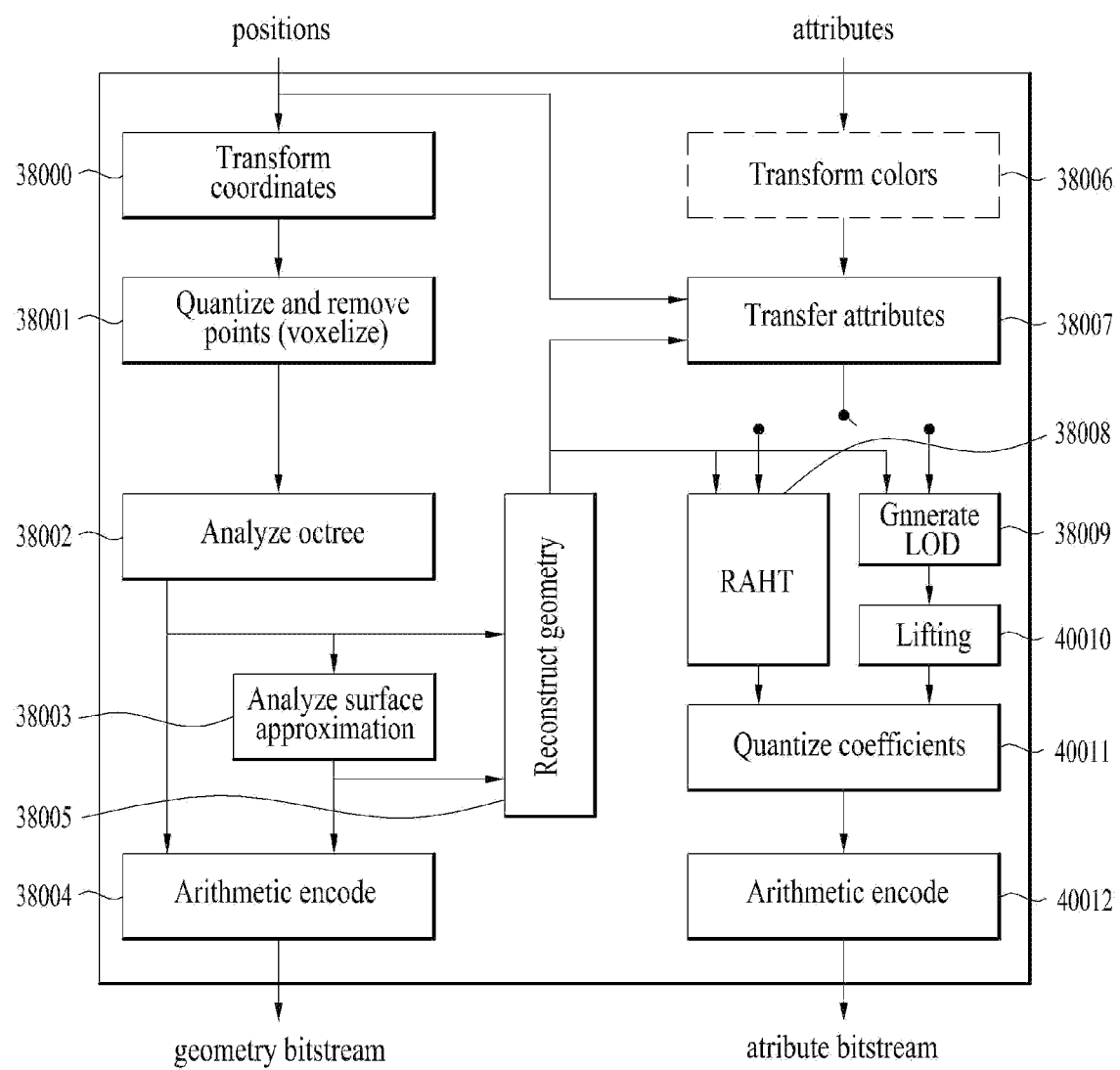
FIG. 4 illustrates an exemplary point cloud encoder according to embodiments.

FIG. 4 illustrates an exemplary point cloud encoder according to embodiments.

FIG. 4 shows an example of the point cloud video encoder 10002 of FIG. 1. The point cloud encoder reconstructs and encodes point cloud data (e.g., positions and/or attributes of the points) to adjust the quality of the point cloud content (to, for example, lossless, lossy, or near-lossless) according to the network condition or applications. When the overall size of the point cloud content is large (e.g., point cloud content of 60 Gbps is given for 30 fps), the point cloud content providing system may fail to stream the content in real time. Accordingly, the point cloud content providing system may reconstruct the point cloud content based on the maximum target bitrate to provide the same in accordance with the network environment or the like.

As described with reference to FIGS. 1 to 2, the point cloud encoder may perform geometry encoding and attribute encoding. The geometry encoding is performed before the attribute encoding.

The point cloud encoder according to the embodiments includes a coordinate transformer (Transform coordinates) 40000, a quantizer (Quantize and remove points (voxelize)) 40001, an octree analyzer (Analyze octree) 40002, and a surface approximation analyzer (Analyze surface approximation) 40003, an arithmetic encoder (Arithmetic encode) 40004, a geometric reconstructor (Reconstruct geometry) 40005, a color transformer (Transform colors) 40006, an attribute transformer (Transform attributes) 40007, a RAHT transformer (RAHT) 40008, an LOD generator (Generate LOD) 40009, a lifting transformer (Lifting) 40010, a coefficient quantizer (Quantize coefficients) 40011, and/or an arithmetic encoder (Arithmetic encode) 40012.

The coordinate transformer 40000, the quantizer 40001, the octree analyzer 40002, the surface approximation analyzer 40003, the arithmetic encoder 40004, and the geometry reconstructor 40005 may perform geometry encoding. The geometry encoding according to the embodiments may include octree geometry coding, predictive tree geometry coding, direct coding, trisoup geometry encoding, and entropy encoding. The direct coding and trisoup geometry encoding are applied selectively or in combination. The geometry encoding is not limited to the above-described example.

As shown in the figure, the coordinate transformer 40000 according to the embodiments receives positions and transforms the same into coordinates. For example, the positions may be transformed into position information in a three-dimensional space (for example, a three-dimensional space represented by an XYZ coordinate system). The position information in the three-dimensional space according to the embodiments may be referred to as geometry information.

The quantizer 40001 according to the embodiments quantizes the geometry. For example, the quantizer 40001 may quantize the points based on a minimum position value of all points (for example, a minimum value on each of the X, Y, and Z axes). The quantizer 40001 performs a quantization operation of multiplying the difference between the minimum position value and the position value of each point by a preset quantization scale value and then finding the nearest integer value by rounding the value obtained through the multiplication. Thus, one or more points may have the same quantized position (or position value). The quantizer 40001 according to the embodiments performs voxelization based on the quantized positions to reconstruct quantized points. As in the case of a pixel, which is the minimum unit containing 2D image/video information, points of point cloud content (or 3D point cloud video) according to the embodiments may be included in one or more voxels. The term voxel, which is a compound of volume and pixel, refers to a 3D cubic space generated when a 3D space is divided into units (unit=1.0) based on the axes representing the 3D space (e.g., X-axis, Y-axis, and Z-axis). The quantizer 40001 may match groups of points in the 3D space with voxels. According to embodiments, one voxel may include only one point. According to embodiments, one voxel may include one or more points. In order to express one voxel as one point, the position of the center of a voxel may be set based on the positions of one or more points included in the voxel. In this case, attributes of all positions included in one voxel may be combined and assigned to the voxel.

The octree analyzer 40002 according to the embodiments performs octree geometry coding (or octree coding) to present voxels in an octree structure. The octree structure represents points matched with voxels, based on the octal tree structure.

The surface approximation analyzer 40003 according to the embodiments may analyze and approximate the octree. The octree analysis and approximation according to the embodiments is a process of analyzing a region containing a plurality of points to efficiently provide octree and voxelization.

The arithmetic encoder 40004 according to the embodiments performs entropy encoding on the octree and/or the approximated octree. For example, the encoding scheme includes arithmetic encoding. As a result of the encoding, a geometry bitstream is generated.

The color transformer 40006, the attribute transformer 40007, the RAHT transformer 40008, the LOD generator 40009, the lifting transformer 40010, the coefficient quantizer 40011, and/or the arithmetic encoder 40012 perform attribute encoding. As described above, one point may have one or more attributes. The attribute encoding according to the embodiments is equally applied to the attributes that one point has. However, when an attribute (e.g., color) includes one or more elements, attribute encoding is independently applied to each element. The attribute encoding according to the embodiments includes color transform coding, attribute transform coding, region adaptive hierarchical transform (RAHT) coding, interpolation-based hierarchical nearest-neighbor prediction (prediction transform) coding, and interpolation-based hierarchical nearest-neighbor prediction with an update/lifting step (lifting transform) coding. Depending on the point cloud content, the RAHT coding, the prediction transform coding and the lifting transform coding described above may be selectively used, or a combination of one or more of the coding schemes may be used. The attribute encoding according to the embodiments is not limited to the above-described example.

The color transformer 40006 according to the embodiments performs color transform coding of transforming color values (or textures) included in the attributes. For example, the color transformer 40006 may transform the format of color information (for example, from RGB to YCbCr). The operation of the color transformer 40006 according to embodiments may be optionally applied according to the color values included in the attributes.

The geometry reconstructor 40005 according to the embodiments reconstructs (decompresses) the octree, the predictive tree and/or the approximated octree. The geometry reconstructor 40005 reconstructs the octree/voxels based on the result of analyzing the distribution of points. The reconstructed octree/voxels may be referred to as reconstructed geometry (restored geometry).

The attribute transformer 40007 according to the embodiments performs attribute transformation to transform the attributes based on the reconstructed geometry and/or the positions on which geometry encoding is not performed. As described above, since the attributes are dependent on the geometry, the attribute transformer 40007 may transform the attributes based on the reconstructed geometry information. For example, based on the position value of a point included in a voxel, the attribute transformer 40007 may transform the attribute of the point at the position. As described above, when the position of the center of a voxel is set based on the positions of one or more points included in the voxel, the attribute transformer 40007 transforms the attributes of the one or more points. When the trisoup geometry encoding is performed, the attribute transformer 40007 may transform the attributes based on the trisoup geometry encoding.

The attribute transformer 40007 may perform the attribute transformation by calculating the average of attributes or attribute values of neighboring points (e.g., color or reflectance of each point) within a specific position/radius from the position (or position value) of the center of each voxel. The attribute transformer 40007 may apply a weight according to the distance from the center to each point in calculating the average. Accordingly, each voxel has a position and a calculated attribute (or attribute value).

The attribute transformer 40007 may search for neighboring points existing within a specific position/radius from the position of the center of each voxel based on the K-D tree or the Morton code. The K-D tree is a binary search tree and supports a data structure capable of managing points based on the positions such that nearest neighbor search (NNS) can be performed quickly. The Morton code is generated by presenting coordinates (e.g., (x, y, z)) representing 3D positions of all points as bit values and mixing the bits. For example, when the coordinates representing the position of a point are (5, 9, 1), the bit values for the coordinates are (0101, 1001, 0001). Mixing the bit values according to the bit index in order of z, y, and x yields 010001000111. This value is expressed as a decimal number of 1095. That is, the Morton code value of the point having coordinates (5, 9, 1) is 1095. The attribute transformer 40007 may order the points based on the Morton code values and perform NNS through a depth-first traversal process. After the attribute transformation operation, the K-D tree or the Morton code is used when the NNS is needed in another transformation process for attribute coding.

As shown in the figure, the transformed attributes are input to the RAHT transformer 40008 and/or the LOD generator 40009.

The RAHT transformer 40008 according to the embodiments performs RAHT coding for predicting attribute information based on the reconstructed geometry information. For example, the RAHT transformer 40008 may predict attribute information of a node at a higher level in the octree based on the attribute information associated with a node at a lower level in the octree.

The LOD generator 40009 according to the embodiments generates a level of detail (LOD) to perform prediction transform coding. The LOD according to the embodiments is a degree of detail of point cloud content. As the LOD value decrease, it indicates that the detail of the point cloud content is degraded. As the LOD value increases, it indicates that the detail of the point cloud content is enhanced. Points may be classified by the LOD.

The lifting transformer 40010 according to the embodiments performs lifting transform coding of transforming the attributes a point cloud based on weights. As described above, lifting transform coding may be optionally applied.

The coefficient quantizer 40011 according to the embodiments quantizes the attribute-coded attributes based on coefficients.

The arithmetic encoder 40012 according to the embodiments encodes the quantized attributes based on arithmetic coding.

Although not shown in the figure, the elements of the point cloud encoder of FIG. 4 may be implemented by hardware including one or more processors or integrated circuits configured to communicate with one or more memories included in the point cloud providing device, software, firmware, or a combination thereof. The one or more processors may perform at least one of the operations and/or functions of the elements of the point cloud encoder of FIG. 4 described above. Additionally, the one or more processors may operate or execute a set of software programs and/or instructions for performing the operations and/or functions of the elements of the point cloud encoder of FIG. 4. The one or more memories according to the embodiments may include a high speed random access memory, or include a non-volatile memory (e.g., one or more magnetic disk storage devices, flash memory devices, or other non-volatile solid-state memory devices).

Figure 5:
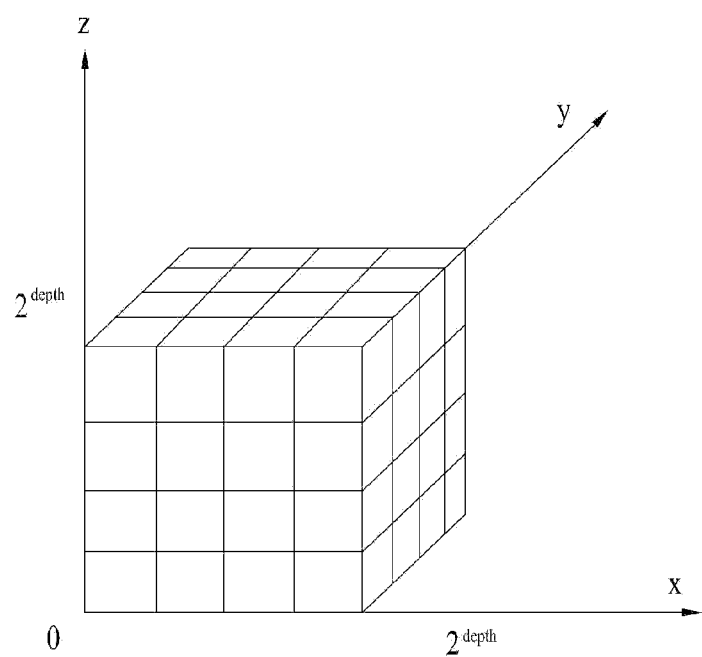
FIG. 5 shows an example of voxels according to embodiments.

FIG. 5 shows an example of voxels according to embodiments.

FIG. 5 shows voxels positioned in a 3D space represented by a coordinate system composed of three axes, which are the X-axis, the Y-axis, and the Z-axis. As described with reference to FIG. 4, the point cloud encoder (e.g., the quantizer 40001) may perform voxelization. Voxel refers to a 3D cubic space generated when a 3D space is divided into units (unit=1.0) based on the axes representing the 3D space (e.g., X-axis, Y-axis, and Z-axis). FIG. 5 shows an example of voxels generated through an octree structure in which a cubical axis-aligned bounding box defined by two poles (0, 0, 0) and ($2^d$, $2^d$, $2^d$) is recursively subdivided. One voxel includes at least one point. The spatial coordinates of a voxel may be estimated from the positional relationship with a voxel group. As described above, a voxel has an attribute (such as color or reflectance) like pixels of a 2D image/video. The details of the voxel are the same as those described with reference to FIG. 4, and therefore a description thereof is omitted.

Figure 6:
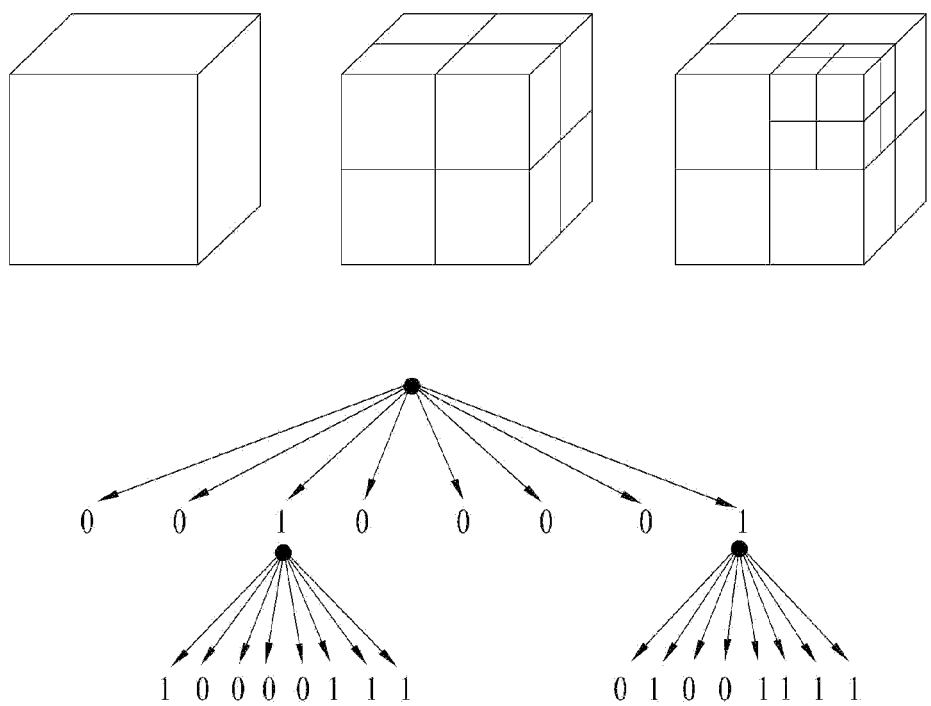
FIG. 6 shows an example of an octree and occupancy code according to embodiments.

FIG. 6 shows an example of an octree and occupancy code according to embodiments.

As described with reference to FIGS. 1 to 4, the point cloud content providing system (point cloud video encoder 10002) or the point cloud encoder (for example, the octree analyzer 40002) performs octree geometry coding (or octree coding) based on an octree structure to efficiently manage the region and/or position of the voxel.

The upper part of FIG. 6 shows an octree structure. The 3D space of the point cloud content according to the embodiments is represented by axes (e.g., X-axis, Y-axis, and Z-axis) of the coordinate system. The octree structure is created by recursive subdividing of a cubical axis-aligned bounding box defined by two poles (0, 0, 0) and $(2^d, 2^d, 2^d)$. Here, $2^d$ may be set to a value constituting the smallest bounding box surrounding all points of the point cloud content (or point cloud video). Here, d denotes the depth of the octree. The value of d is determined in the following equation. In the following equation, $(x^{int}_n, y^{int}_n, z^{int}_n)$ denotes the positions (or position values) of quantized points.

$$d = \text{Ceil}(\text{Log } 2(\text{Max}(x_n^{int}, y_n^{int}, z_r^{int}, n-1, \ldots, N)+1))$$

As shown in the middle of the upper part of FIG. 6, the entire 3D space may be divided into eight spaces according to partition. Each divided space is represented by a cube with six faces. As shown in the upper right of FIG. 6, each of the eight spaces is divided again based on the axes of the coordinate system (e.g., X-axis, Y-axis, and Z-axis). Accordingly, each space is divided into eight smaller spaces. The divided smaller space is also represented by a cube with six faces. This partitioning scheme is applied until the leaf node of the octree becomes a voxel.

The lower part of FIG. 6 shows an octree occupancy code. The occupancy code of the octree is generated to indicate whether each of the eight divided spaces generated by dividing one space contains at least one point. Accordingly, a single occupancy code is represented by eight child nodes. Each child node represents the occupancy of a divided space, and the child node has a value in 1 bit. Accordingly, the occupancy code is represented as an 8-bit code. That is, when at least one point is contained in the space corresponding to a child node, the node is assigned a value of 1. When no point is contained in the space corresponding to the child node (the space is empty), the node is assigned a value of 0. Since the occupancy code shown in FIG. 6 is 00100001, it indicates that the spaces corresponding to the third child node and the eighth child node among the eight child nodes each contain at least one point. As shown in the figure, each of the third child node and the eighth child node has eight child nodes, and the child nodes are represented by an 8-bit occupancy code. The figure shows that the occupancy code of the third child node is 10000111, and the occupancy code of the eighth child node is 01001111. The point cloud encoder (for example, the arithmetic encoder 40004) according to the embodiments may perform entropy encoding on the occupancy codes. In order to increase the compression efficiency, the point cloud encoder may perform intra/inter-coding on the occupancy codes. The reception device (for example, the reception device 10004 or the point cloud video decoder 10006) according to the embodiments reconstructs the octree based on the occupancy codes.

The point cloud encoder (for example, the point cloud encoder of FIG. 4 or the octree analyzer 40002) according to the embodiments may perform voxelization and octree coding to store the positions of points. However, points are not always evenly distributed in the 3D space, and accordingly there may be a specific region in which fewer points are present. Accordingly, it is inefficient to perform voxelization for the entire 3D space. For example, when a specific region contains few points, voxelization does not need to be performed in the specific region.

Accordingly, for the above-described specific region (or a node other than the leaf node of the octree), the point cloud encoder according to the embodiments may skip voxelization and perform direct coding to directly code the positions of points included in the specific region. The coordinates of a direct coding point according to the embodiments are referred to as direct coding mode (DCM). The point cloud encoder according to the embodiments may also perform trisoup geometry encoding, which is to reconstruct the positions of the points in the specific region (or node) based on voxels, based on a surface model. The trisoup geometry encoding is geometry encoding that represents an object as a series of triangular meshes. Accordingly, the point cloud decoder may generate a point cloud from the mesh surface. The direct coding and trisoup geometry encoding according to the embodiments may be selectively performed. In addition, the direct coding and trisoup geometry encoding according to the embodiments may be performed in combination with octree geometry coding (or octree coding).

To perform direct coding, the option to use the direct mode for applying direct coding should be activated. A node to which direct coding is to be applied is not a leaf node, and points less than a threshold should be present within a specific node. In addition, the total number of points to which direct coding is to be applied should not exceed a preset threshold. When the conditions above are satisfied, the point cloud encoder (or the arithmetic encoder 40004) according to the embodiments may perform entropy coding on the positions (or position values) of the points.

The point cloud encoder (for example, the surface approximation analyzer 40003) according to the embodiments may determine a specific level of the octree (a level less than the depth d of the octree), and the surface model may be used staring with that level to perform trisoup geometry encoding to reconstruct the positions of points in the region of the node based on voxels (Trisoup mode). The point cloud encoder according to the embodiments may specify a level at which trisoup geometry encoding is to be applied. For example, when the specific level is equal to the depth of the octree, the point cloud encoder does not operate in the trisoup mode. In other words, the point cloud encoder according to the embodiments may operate in the trisoup mode only when the specified level is less than the value of depth of the octree. The 3D cube region of the nodes at the specified level according to the embodiments is called a block. One block may include one or more voxels. The block or voxel may correspond to a brick. Geometry is represented as a surface within each block. The surface according to embodiments may intersect with each edge of a block at most once.

One block has 12 edges, and accordingly there are at least 12 intersections in one block. Each intersection is called a vertex (or apex). A vertex present along an edge is detected when there is at least one occupied voxel adjacent to the edge among all blocks sharing the edge. The occupied voxel according to the embodiments refers to a voxel containing a point. The position of the vertex detected along the edge is the average position along the edge of all voxels adjacent to the edge among all blocks sharing the edge.

Once the vertex is detected, the point cloud encoder according to the embodiments may perform entropy encoding on the starting point (x, y, z) of the edge, the direction vector $(\Delta x, \Delta y, \Delta z)$ of the edge, and the vertex position value (relative position value within the edge). When the trisoup geometry encoding is applied, the point cloud encoder according to the embodiments (for example, the geometry reconstructor 40005) may generate restored geometry (reconstructed geometry) by performing the triangle reconstruction, up-sampling, and voxelization processes.

The vertices positioned at the edge of the block determine a surface that passes through the block. The surface according to the embodiments is a non-planar polygon. In the triangle reconstruction process, a surface represented by a triangle is reconstructed based on the starting point of the edge, the direction vector of the edge, and the position values of the vertices. The triangle reconstruction process is performed by: i) calculating the centroid value of each vertex, ii) subtracting the center value from each vertex value, and iii) estimating the sum of the squares of the values obtained by the subtraction.

$$\begin{bmatrix} \mu_x \\ \mu_y \\ \mu_z \end{bmatrix} = \sum_{i=1}^{n} \begin{bmatrix} x_i \\ y_i \\ z_i \end{bmatrix};$$

$$\begin{bmatrix} \overline{x}_i \\ \overline{y}_i \\ \overline{z}_i \end{bmatrix} = \begin{bmatrix} x_i \\ y_i \\ z_i \end{bmatrix} - \begin{bmatrix} \mu_x \\ \mu_y \\ \mu_z \end{bmatrix}; \quad \text{ii)}$$

$$\begin{bmatrix} \sigma_x^2 \\ \sigma_y^2 \\ \sigma_z^2 \end{bmatrix} = \sum_{i=1}^{n} \begin{bmatrix} \overline{x}_i^2 \\ \overline{y}_i^2 \\ \overline{z}_i^2 \end{bmatrix} \quad \text{iii)}$$

The minimum value of the sum is estimated, and the projection process is performed according to the axis with the minimum value. For example, when the element x is the minimum, each vertex is projected on the x-axis with respect to the center of the block, and projected on the (y, z) plane. When the values obtained through projection on the (y, z) plane are (ai, bi), the value of θ is estimated through atan 2(bi, ai), and the vertices are ordered based on the value of θ. The table below shows a combination of vertices for creating a triangle according to the number of the vertices. The vertices are ordered from 1 to n. The table below shows that for four vertices, two triangles may be constructed according to combinations of vertices. The first triangle may consist of vertices 1, 2, and 3 among the ordered vertices, and the second triangle may consist of vertices 3, 4, and 1 among the ordered vertices.

TABLE 2-1

Triangles formed from vertices ordered 1, . . . , n

| n | triangles |
|---|---|
| 3 | (1, 2, 3) |
| 4 | (1, 2, 3), (3, 4, 1) |
| 5 | (1, 2, 3), (3, 4, 5), (5, 1, 3) |
| 6 | (1, 2, 3), (3, 4, 5), (5, 6, 1), (1, 3, 5) |
| 7 | (1, 2, 3), (3, 4, 5), (5, 6, 7), (7, 1, 3), (3, 5, 7) |
| 8 | (1, 2, 3), (3, 4, 5), (5, 6, 7), (7, 8, 1), (1, 3, 5), (5, 7, 1) |
| 9 | (1, 2, 3), (3, 4, 5), (5, 6, 7), (7, 8, 9), (9, 1, 3), (3, 5, 7), (7, 9, 3) |
| 10 | (1, 2, 3), (3, 4, 5), (5, 6, 7), (7, 8, 9), (9, 10, 1), (1, 3, 5), (5, 7, 9), (9, 1, 5) |
| 11 | (1, 2, 3), (3, 4, 5), (5, 6, 7), (7, 8, 9), (9, 10, 11), (11, 1, 3), (3, 5, 7), (7, 9, 11), (11, 3, 7) |
| 12 | (1, 2, 3), (3, 4, 5), (5, 6, 7), (7, 8, 9), (9, 10, 11), (11, 12, 1), (1, 3, 5), (5, 7, 9), (9, 11, 1), (1, 5, 9) |

The upsampling process is performed to add points in the middle along the edge of the triangle and perform voxelization. The added points are generated based on the upsampling factor and the width of the block. The added points are called refined vertices. The point cloud encoder according to the embodiments may voxelize the refined vertices. In addition, the point cloud encoder may perform attribute encoding based on the voxelized positions (or position values).

FIG. 7 shows an example of a neighbor node pattern according to embodiments.

In order to increase the compression efficiency of the point cloud video, the point cloud encoder according to the embodiments may perform entropy coding based on context adaptive arithmetic coding.

As described with reference to FIGS. 1 to 6, the point cloud content providing system or the point cloud encoder (for example, the point cloud video encoder 10002, the point cloud encoder or arithmetic encoder 40004 of FIG. 4) may perform entropy coding on the occupancy code immediately. In addition, the point cloud content providing system or the point cloud encoder may perform entropy encoding (intra encoding) based on the occupancy code of the current node and the occupancy of neighboring nodes, or perform entropy encoding (inter encoding) based on the occupancy code of the previous frame. A frame according to embodiments represents a set of point cloud videos generated at the same time. The compression efficiency of intra encoding/inter encoding according to the embodiments may depend on the number of neighboring nodes that are referenced. When the bits increase, the operation becomes complicated, but the encoding may be biased to one side, which may increase the compression efficiency. For example, when a 3-bit context is given, coding needs to be performed using 23=8 methods. The part divided for coding affects the complexity of implementation. Accordingly, it is necessary to meet an appropriate level of compression efficiency and complexity.

FIG. 7 illustrates a process of obtaining an occupancy pattern based on the occupancy of neighbor nodes. The point cloud encoder according to the embodiments determines occupancy of neighbor nodes of each node of the octree and obtains a value of a neighbor pattern. The neighbor node pattern is used to infer the occupancy pattern of the node. The left part of FIG. 7 shows a cube corresponding to a node (a cube positioned in the middle) and six cubes (neighbor nodes) sharing at least one face with the cube. The nodes shown in the figure are nodes of the same depth. The numbers shown in the figure represent weights (1, 2, 4, 8, 16, and 32) associated with the six nodes, respectively. The weights are assigned sequentially according to the positions of neighboring nodes.

The right part of FIG. 7 shows neighbor node pattern values. A neighbor node pattern value is the sum of values multiplied by the weight of an occupied neighbor node (a neighbor node having a point). Accordingly, the neighbor node pattern values are 0 to 63. When the neighbor node pattern value is 0, it indicates that there is no node having a point (no occupied node) among the neighbor nodes of the node. When the neighbor node pattern value is 63, it indicates that all neighbor nodes are occupied nodes. As shown in the figure, since neighbor nodes to which weights 1, 2, 4, and 8 are assigned are occupied nodes, the neighbor node pattern value is 15, the sum of 1, 2, 4, and 8. The point cloud encoder may perform coding according to the neighbor node pattern value (for example, when the neighbor node pattern value is 63, 64 kinds of coding may be performed). According to embodiments, the point cloud encoder may reduce coding complexity by changing a neighbor node pattern value (for example, based on a table by which 64 is changed to 10 or 6).

Figure 8:
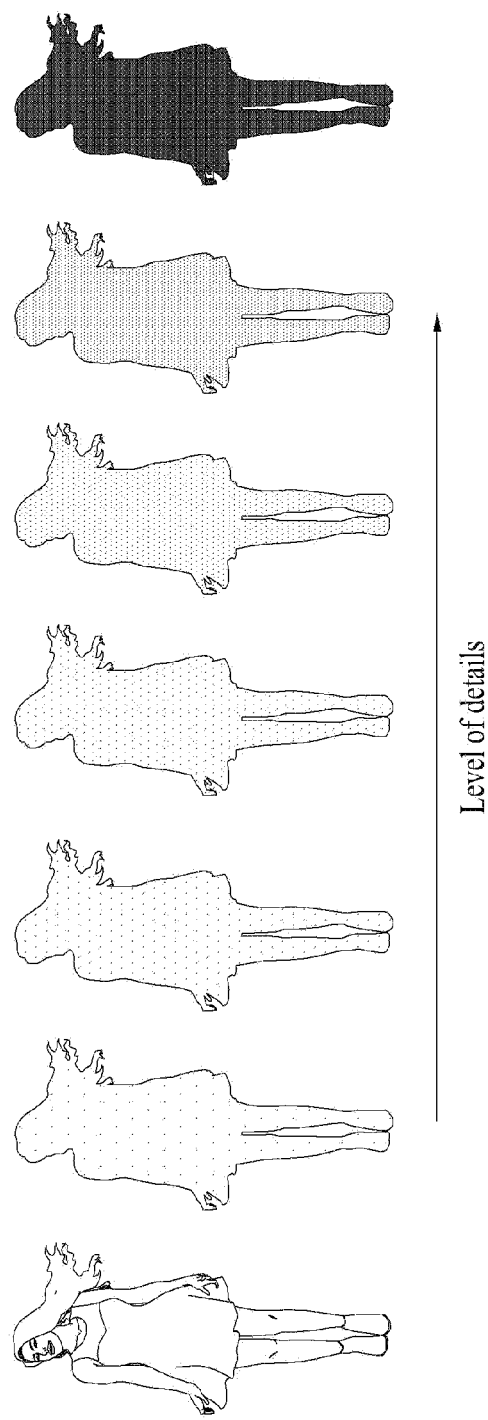
FIG. 8 illustrates an example of point configuration in each LOD according to embodiments.

FIG. 8 illustrates an example of point configuration in each LOD according to embodiments.

As described with reference to FIGS. 1 to 7, encoded geometry is reconstructed (decompressed) before attribute encoding is performed. When direct coding is applied, the geometry reconstruction operation may include changing the placement of direct coded points (e.g., placing the direct coded points in front of the point cloud data). When trisoup geometry encoding is applied, the geometry reconstruction process is performed through triangle reconstruction, up-sampling, and voxelization. Since the attribute depends on the geometry, attribute encoding is performed based on the reconstructed geometry.

The point cloud encoder (for example, the LOD generator 40009) may classify (reorganize) points by LOD. The figure shows the point cloud content corresponding to LODs. The leftmost picture in the figure represents original point cloud content. The second picture from the left of the figure represents distribution of the points in the lowest LOD, and the rightmost picture in the figure represents distribution of the points in the highest LOD. That is, the points in the lowest LOD are sparsely distributed, and the points in the highest LOD are densely distributed. That is, as the LOD rises in the direction pointed by the arrow indicated at the bottom of the figure, the space (or distance) between points is narrowed.

Figure 9:
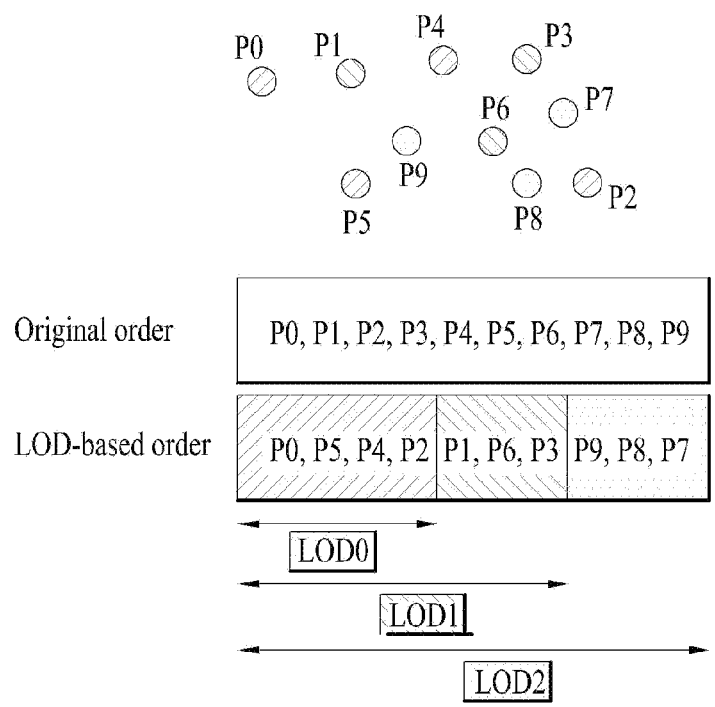
FIG. 9 illustrates an example of point configuration in each LOD according to embodiments.

FIG. 9 illustrates an example of point configuration for each LOD according to embodiments.

As described with reference to FIGS. 1 to 8, the point cloud content providing system, or the point cloud encoder (for example, the point cloud video encoder 10002, the point cloud encoder of FIG. 4, or the LOD generator 40009) may generates an LOD. The LOD is generated by reorganizing the points into a set of refinement levels according to a set LOD distance value (or a set of Euclidean distances). The LOD generation process is performed not only by the point cloud encoder, but also by the point cloud decoder.

The upper part of FIG. 9 shows examples (P0 to P9) of points of the point cloud content distributed in a 3D space. In FIG. 9, the original order represents the order of points P0 to P9 before LOD generation. In FIG. 9, the LOD based order represents the order of points according to the LOD generation. Points are reorganized by LOD. Also, a high LOD contains the points belonging to lower LODs. As shown in FIG. 9, LOD0 contains P0, P5, P4 and P2. LOD1 contains the points of LOD0, P1, P6 and P3. LOD2 contains the points of LOD0, the points of LOD1, P9, P8 and P7.

As described with reference to FIG. 4, the point cloud encoder according to the embodiments may perform prediction transform coding, lifting transform coding, and RAHT transform coding selectively or in combination.

The point cloud encoder according to the embodiments may generate a predictor for points to perform prediction transform coding for setting a predicted attribute (or predicted attribute value) of each point. That is, N predictors may be generated for N points. The predictor according to the embodiments may calculate a weight (=1/distance) based on the LOD value of each point, indexing information about neighboring points present within a set distance for each LOD, and a distance to the neighboring points.

The predicted attribute (or attribute value) according to the embodiments is set to the average of values obtained by multiplying the attributes (or attribute values) (e.g., color, reflectance, etc.) of neighbor points set in the predictor of each point by a weight (or weight value) calculated based on the distance to each neighbor point. The point cloud encoder according to the embodiments (for example, the coefficient quantizer 40011) may quantize and inversely quantize the residuals (which may be called residual attributes, residual attribute values, or attribute prediction residuals) obtained by subtracting a predicted attribute (attribute value) from the attribute (attribute value) of each point. The quantization process is configured as shown in the following table.

TABLE

Attribute prediction residuals quantization pseudo code

```
int PCCQuantization(int value, int quantStep) {
    if( value >=0) {
        return floor(value / quantStep + 1.0 / 3.0);
    } else {
        return -floor(-value / quantStep + 1.0 / 3.0);
    }
}
```

TABLE

Attribute prediction residuals inverse quantization pseudo code

```
int PCCInverseQuantization(int value, int quantStep) {
    if( quantStep ==0) {
        return value;
    } else {
        return value * quantStep;
    }
}
```

When the predictor of each point has neighbor points, the point cloud encoder (e.g., the arithmetic encoder 40012) according to the embodiments may perform entropy coding on the quantized and inversely quantized residual values as described above. When the predictor of each point has no neighbor point, the point cloud encoder according to the embodiments (for example, the arithmetic encoder 40012) may perform entropy coding on the attributes of the corresponding point without performing the above-described operation.

The point cloud encoder according to the embodiments (for example, the lifting transformer 40010) may generate a predictor of each point, set the calculated LOD and register neighbor points in the predictor, and set weights according to the distances to neighbor points to perform lifting transform coding. The lifting transform coding according to the embodiments is similar to the above-described prediction transform coding, but differs therefrom in that weights are cumulatively applied to attribute values. The process of cumulatively applying weights to the attribute values according to embodiments is configured as follows.

1) Create an array Quantization Weight (QW) for storing the weight value of each point. The initial value of all elements of QW is 1.0. Multiply the QW values of the predictor indexes of the neighbor nodes registered in the predictor by the weight of the predictor of the current point, and add the values obtained by the multiplication.

2) Lift prediction process: Subtract the value obtained by multiplying the attribute value of the point by the weight from the existing attribute value to calculate a predicted attribute value.

3) Create temporary arrays called updateweight and update and initialize the temporary arrays to zero.

4) Cumulatively add the weights calculated by multiplying the weights calculated for all predictors by a weight stored in the QW corresponding to a predictor index to the updateweight array as indexes of neighbor nodes. Cumulatively add, to the update array, a value obtained by multiplying the attribute value of the index of a neighbor node by the calculated weight.

5) Lift update process: Divide the attribute values of the update array for all predictors by the weight value of the updateweight array of the predictor index, and add the existing attribute value to the values obtained by the division.

6) Calculate predicted attributes by multiplying the attribute values updated through the lift update process by the weight updated through the lift prediction process (stored in the QW) for all predictors. The point cloud encoder (e.g., coefficient quantizer 40011) according to the embodiments quantizes the predicted attribute values. In addition, the point cloud encoder (e.g., the arithmetic encoder 40012) performs entropy coding on the quantized attribute values.

The point cloud encoder (for example, the RAHT transformer 40008) according to the embodiments may perform RAHT transform coding in which attributes of nodes of a higher level are predicted using the attributes associated with nodes of a lower level in the octree. RAHT transform coding is an example of attribute intra coding through an octree backward scan. The point cloud encoder according to the embodiments scans the entire region from the voxel and repeats the merging process of merging the voxels into a larger block at each step until the root node is reached. The merging process according to the embodiments is performed only on the occupied nodes. The merging process is not performed on the empty node. The merging process is performed on an upper node immediately above the empty node.

The equation below represents a RAHT transformation matrix. In the equation, $g_{l_{x,y,z}}$ denotes the average attribute value of voxels at level l. $g_{l_{x,y,z}}$ may be calculated based on $g_{l+1_{2x,y,z}}$ and $g_{l+2_{2x+1,y,z}}$. The weights for $g_{l_{2x,y,z}}$ and $g_{l_{2x+1,y,z}}$ are $W1=W_{l_{2x,y,z}}$ and $w2=W_{l_{2x+1,y,z}}$.

$$\begin{bmatrix} g_{l-1_{x,y,z}} \\ g_{l-1_{x,y,z}} \end{bmatrix} = T_{w1w2} \begin{bmatrix} g_{l_{2x,y,z}} \\ g_{l_{2x,y,z}} \end{bmatrix},$$

$$T_{w1w2} = \frac{1}{\sqrt{w1+w2}} \begin{bmatrix} \sqrt{w1} & \sqrt{w2} \\ -\sqrt{w2} & \sqrt{w1} \end{bmatrix}$$

Here, $g_{l-1_{x,y,z}}$ is a low-pass value and is used in the merging process at the next higher level. $h_{l_{x,y,z}}$ denotes high-pass coefficients. The high-pass coefficients at each step are quantized and subjected to entropy coding (for example, encoding by the arithmetic encoder 400012). The weights are calculated as $W_{l-1_{x,y,z}} = W_{l_{2x,y,z}} + W_{l_{2x+1,y,z}}$. The root node is created through the $g_{1_{0,0,0}}$ and $g_{1_{0,0,1}}$ as follows.

$$\begin{bmatrix} gDC \\ h_{0_{0,0,0}} \end{bmatrix} = T_{w1000\,w1001} \begin{bmatrix} g_{1_{0,0,0z}} \\ g_{1_{0,0,1}} \end{bmatrix}$$

The value of gDC is also quantized and subjected to entropy coding like the high-pass coefficients.

Figure 10:
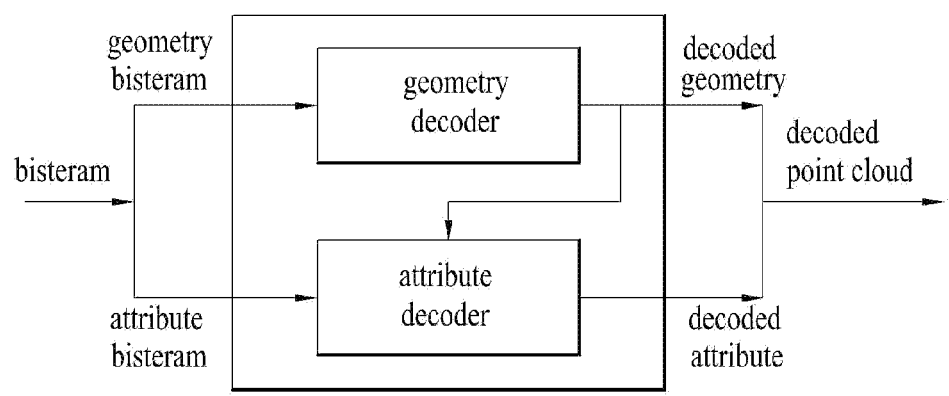
FIG. 10 illustrates a point cloud decoder according to embodiments.

FIG. 10 illustrates a point cloud decoder according to embodiments.

The point cloud decoder illustrated in FIG. 10 is an example of the point cloud video decoder 10006 described in FIG. 1, and may perform the same or similar operations as the operations of the point cloud video decoder 10006 illustrated in FIG. 1. As shown in the figure, the point cloud decoder may receive a geometry bitstream and an attribute bitstream contained in one or more bitstreams. The point cloud decoder includes a geometry decoder and an attribute decoder. The geometry decoder performs geometry decoding on the geometry bitstream and outputs decoded geometry. The attribute decoder performs attribute decoding based on the decoded geometry and the attribute bitstream, and outputs decoded attributes. The decoded geometry and decoded attributes are used to reconstruct point cloud content (a decoded point cloud).

Figure 11:
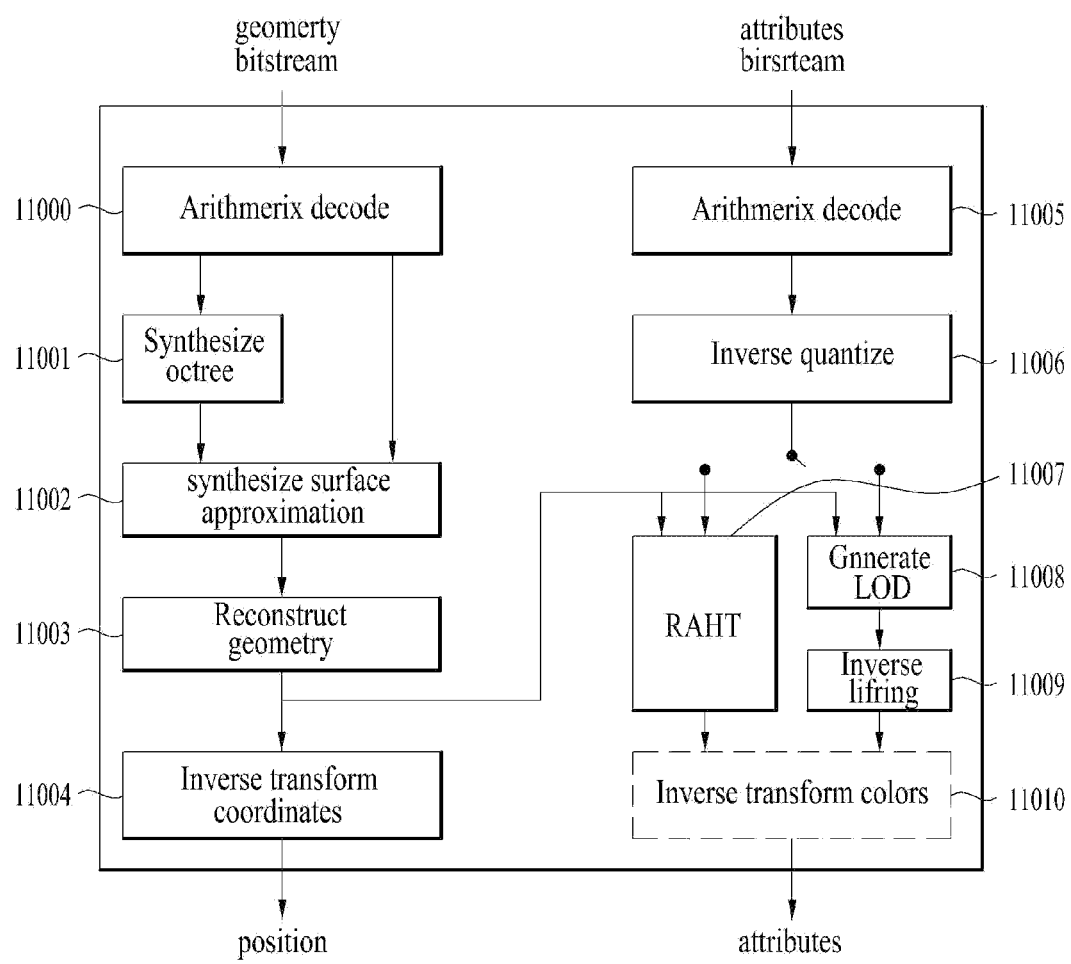
FIG. 11 illustrates a point cloud decoder according to embodiments.

FIG. 11 illustrates a point cloud decoder according to embodiments.

The point cloud decoder illustrated in FIG. 11 is an example of the point cloud decoder illustrated in FIG. 10, and may perform a decoding operation, which is a reverse process of the encoding operation of the point cloud encoder illustrated in FIGS. 1 to 9.

As described with reference to FIGS. 1 and 10, the point cloud decoder may perform geometry decoding and attribute decoding. The geometry decoding is performed before the attribute decoding.

The point cloud decoder according to the embodiments includes an arithmetic decoder (Arithmetic decode) 11000, an octree synthesizer (Synthesize octree) 11001, a surface approximation synthesizer (Synthesize surface approximation) 11002, and a geometry reconstructor (Reconstruct geometry) 11003, a coordinate inverse transformer (Inverse transform coordinates) 11004, an arithmetic decoder (Arithmetic decode) 11005, an inverse quantizer (Inverse quantize) 11006, a RAHT transformer 11007, an LOD generator (Generate LOD) 11008, an inverse lifter (inverse lifting) 11009, and/or a color inverse transformer (Inverse transform colors) 11010.

The arithmetic decoder 11000, the octree synthesizer 11001, the surface approximation synthesizer 11002, and the geometry reconstructor 11003, and the coordinate inverse transformer 11004 may perform geometry decoding. The geometry decoding according to the embodiments may include direct decoding and trisoup geometry decoding. The direct decoding and trisoup geometry decoding are selectively applied. The geometry decoding is not limited to the above-described example, and is performed as a reverse process of the geometry encoding described with reference to FIGS. 1 to 9.

The arithmetic decoder 11000 according to the embodiments decodes the received geometry bitstream based on the arithmetic coding. The operation of the arithmetic decoder 11000 corresponds to the inverse process of the arithmetic encoder 40004.

The octree synthesizer 11001 according to the embodiments may generate an octree by acquiring an occupancy code from the decoded geometry bitstream (or information on the geometry secured as a result of decoding). The occupancy code is configured as described in detail with reference to FIGS. 1 to 9.

When the trisoup geometry encoding is applied, the surface approximation synthesizer 11002 according to the embodiments may synthesize a surface based on the decoded geometry and/or the generated octree.

The geometry reconstructor 11003 according to the embodiments may regenerate geometry based on the surface and/or the decoded geometry. As described with reference to FIGS. 1 to 9, direct coding and trisoup geometry encoding are selectively applied. Accordingly, the geometry reconstructor 11003 directly imports and adds position information about the points to which direct coding is applied. When the trisoup geometry encoding is applied, the geometry reconstructor 11003 may reconstruct the geometry by performing the reconstruction operations of the geometry reconstructor 40005, for example, triangle reconstruction, up-sampling, and voxelization. Details are the same as those described with reference to FIG. 6, and thus description thereof is omitted. The reconstructed geometry may include a point cloud picture or frame that does not contain attributes.

The coordinate inverse transformer 11004 according to the embodiments may acquire positions of the points by transforming the coordinates based on the reconstructed geometry.

The arithmetic decoder 11005, the inverse quantizer 11006, the RAHT transformer 11007, the LOD generator 11008, the inverse lifter 11009, and/or the color inverse transformer 11010 may perform the attribute decoding described with reference to FIG. 10. The attribute decoding according to the embodiments includes region adaptive hierarchical transform (RAHT) decoding, interpolation-based hierarchical nearest-neighbor prediction (prediction transform) decoding, and interpolation-based hierarchical nearest-neighbor prediction with an update/lifting step (lifting transform) decoding. The three decoding schemes described above may be used selectively, or a combination of one or more decoding schemes may be used. The attribute decoding according to the embodiments is not limited to the above-described example.

The arithmetic decoder 11005 according to the embodiments decodes the attribute bitstream by arithmetic coding.

The inverse quantizer 11006 according to the embodiments inversely quantizes the information about the decoded attribute bitstream or attributes secured as a result of the decoding, and outputs the inversely quantized attributes (or attribute values). The inverse quantization may be selectively applied based on the attribute encoding of the point cloud encoder.

According to embodiments, the RAHT transformer 11007, the LOD generator 11008, and/or the inverse lifter 11009 may process the reconstructed geometry and the inversely quantized attributes. As described above, the RAHT transformer 11007, the LOD generator 11008, and/or the inverse lifter 11009 may selectively perform a decoding operation corresponding to the encoding of the point cloud encoder.

The color inverse transformer 11010 according to the embodiments performs inverse transform coding to inversely transform a color value (or texture) included in the decoded attributes. The operation of the color inverse transformer 11010 may be selectively performed based on the operation of the color transformer 40006 of the point cloud encoder.

Although not shown in the figure, the elements of the point cloud decoder of FIG. 11 may be implemented by hardware including one or more processors or integrated circuits configured to communicate with one or more memories included in the point cloud providing device, software, firmware, or a combination thereof. The one or more processors may perform at least one or more of the operations and/or functions of the elements of the point cloud decoder of FIG. 11 described above. Additionally, the one or more processors may operate or execute a set of software programs and/or instructions for performing the operations and/or functions of the elements of the point cloud decoder of FIG. 11.

Figure 12:
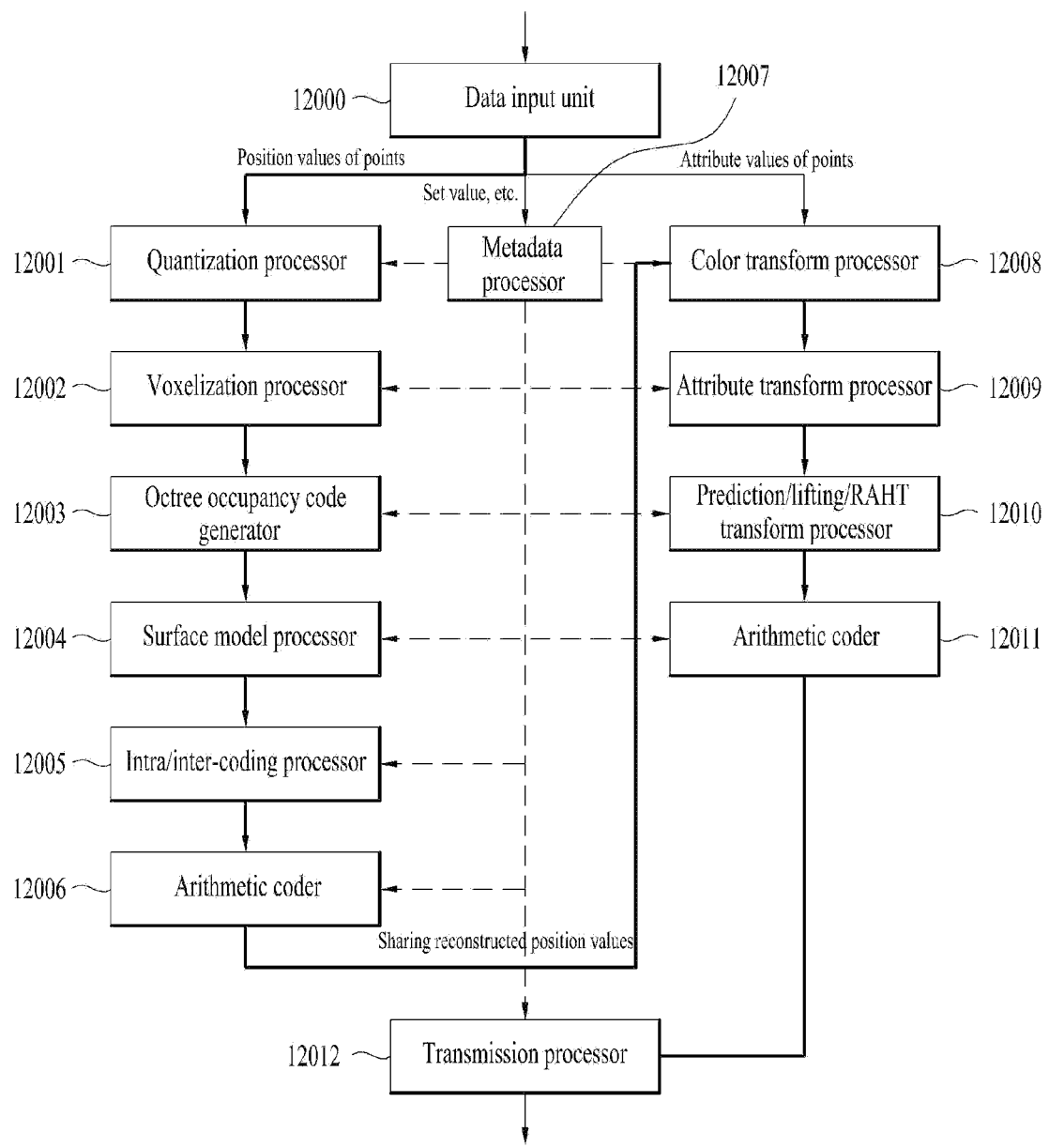
FIG. 12 illustrates a point cloud data transmission device according to embodiments.

FIG. 12 illustrates a transmission device according to embodiments.

The transmission device shown in FIG. 12 is an example of the transmission device 10000 of FIG. 1 (or the point cloud encoder of FIG. 4). The transmission device illustrated in FIG. 12 may perform one or more of the operations and methods the same as or similar to those of the point cloud encoder described with reference to FIGS. 1 to 9. The transmission device according to the embodiments may include a data input unit 12000, a quantization processor 12001, a voxelization processor 12002, an octree occupancy code generator 12003, a surface model processor 12004, an intra/inter-coding processor 12005, an arithmetic coder 12006, a metadata processor 12007, a color transform processor 12008, an attribute transform processor 12009, a prediction/lifting/RAHT transform processor 12010, an arithmetic coder 12011 and/or a transmission processor 12012.

The data input unit 12000 according to the embodiments receives or acquires point cloud data. The data input unit 12000 may perform an operation and/or acquisition method the same as or similar to the operation and/or acquisition method of the point cloud video acquirer 10001 (or the acquisition process 20000 described with reference to FIG. 2).

The data input unit 12000, the quantization processor 12001, the voxelization processor 12002, the octree occupancy code generator 12003, the surface model processor 12004, the intra/inter-coding processor 12005, and the arithmetic coder 12006 perform geometry encoding. The geometry encoding according to the embodiments is the same as or similar to the geometry encoding described with reference to FIGS. 1 to 9, and thus a detailed description thereof is omitted.

The quantization processor 12001 according to the embodiments quantizes geometry (e.g., position values of points). The operation and/or quantization of the quantization processor 12001 is the same as or similar to the operation and/or quantization of the quantizer 40001 described with reference to FIG. 4. Details are the same as those described with reference to FIGS. 1 to 9.

The voxelization processor 12002 according to the embodiments voxelizes the quantized position values of the points. The voxelization processor 120002 may perform an operation and/or process the same or similar to the operation and/or the voxelization process of the quantizer 40001 described with reference to FIG. 4. Details are the same as those described with reference to FIGS. 1 to 9.

The octree occupancy code generator 12003 according to the embodiments performs octree coding on the voxelized positions of the points based on an octree structure. The octree occupancy code generator 12003 may generate an occupancy code. The octree occupancy code generator 12003 may perform an operation and/or method the same as or similar to the operation and/or method of the point cloud encoder (or the octree analyzer 40002) described with reference to FIGS. 4 and 6. Details are the same as those described with reference to FIGS. 1 to 9.

The surface model processor 12004 according to the embodiments may perform trisoup geometry encoding based on a surface model to reconstruct the positions of points in a specific region (or node) on a voxel basis. The surface model processor 12004 may perform an operation and/or method the same as or similar to the operation and/or method of the point cloud encoder (for example, the surface approximation analyzer 40003) described with reference to FIG. 4. Details are the same as those described with reference to FIGS. 1 to 9.

The intra/inter-coding processor 12005 according to the embodiments may perform intra/inter-coding on point cloud data. The intra/inter-coding processor 12005 may perform coding the same as or similar to the intra/inter-coding described with reference to FIG. 7. Details are the same as those described with reference to FIG. 7. According to embodiments, the intra/inter-coding processor 12005 may be included in the arithmetic coder 12006.

The arithmetic coder 12006 according to the embodiments performs entropy encoding on an octree of the point cloud data and/or an approximated octree. For example, the encoding scheme includes arithmetic encoding. The arithmetic coder 12006 performs an operation and/or method the same as or similar to the operation and/or method of the arithmetic encoder 40004.

The metadata processor 12007 according to the embodiments processes metadata about the point cloud data, for example, a set value, and provides the same to a necessary processing process such as geometry encoding and/or attribute encoding. Also, the metadata processor 12007 according to the embodiments may generate and/or process signaling information related to the geometry encoding and/or the attribute encoding. The signaling information according to the embodiments may be encoded separately from the geometry encoding and/or the attribute encoding. The signaling information according to the embodiments may be interleaved.

The color transform processor 12008, the attribute transform processor 12009, the prediction/lifting/RAHT transform processor 12010, and the arithmetic coder 12011 perform the attribute encoding. The attribute encoding according to the embodiments is the same as or similar to the attribute encoding described with reference to FIGS. 1 to 9, and thus a detailed description thereof is omitted.

The color transform processor 12008 according to the embodiments performs color transform coding to transform color values included in attributes. The color transform processor 12008 may perform color transform coding based on the reconstructed geometry. The reconstructed geometry is the same as described with reference to FIGS. 1 to 9. Also, it performs an operation and/or method the same as or similar to the operation and/or method of the color transformer 40006 described with reference to FIG. 4 is performed. The detailed description thereof is omitted.

The attribute transform processor 12009 according to the embodiments performs attribute transformation to transform the attributes based on the reconstructed geometry and/or the positions on which geometry encoding is not performed. The attribute transform processor 12009 performs an operation and/or method the same as or similar to the operation and/or method of the attribute transformer 40007 described with reference to FIG. 4. The detailed description thereof is omitted. The prediction/lifting/RAHT transform processor 12010 according to the embodiments may code the transformed attributes by any one or a combination of RAHT coding, prediction transform coding, and lifting transform coding. The prediction/lifting/RAHT transform processor 12010 performs at least one of the operations the same as or similar to the operations of the RAHT transformer 40008, the LOD generator 40009, and the lifting transformer 40010 described with reference to FIG. 4. In addition, the prediction transform coding, the lifting transform coding, and the RAHT transform coding are the same as those described with reference to FIGS. 1 to 9, and thus a detailed description thereof is omitted.

The arithmetic coder 12011 according to the embodiments may encode the coded attributes based on the arithmetic coding. The arithmetic coder 12011 performs an operation and/or method the same as or similar to the operation and/or method of the arithmetic encoder 40012.

The transmission processor 12012 according to the embodiments may transmit each bitstream containing encoded geometry and/or encoded attributes and metadata information, or transmit one bitstream configured with the encoded geometry and/or the encoded attributes and the metadata information. When the encoded geometry and/or the encoded attributes and the metadata information according to the embodiments are configured into one bitstream, the bitstream may include one or more sub-bitstreams. The bitstream according to the embodiments may contain signaling information including a sequence parameter set (SPS) for signaling of a sequence level, a geometry parameter set (GPS) for signaling of geometry information coding, an attribute parameter set (APS) for signaling of attribute information coding, and a tile parameter set (TPS) for signaling of a tile level, and slice data. The slice data may include information about one or more slices. One slice according to embodiments may include one geometry bitstream Geom00 and one or more attribute bitstreams Attr00 and Attr10.

A slice refers to a series of syntax elements representing the entirety or part of a coded point cloud frame.

The TPS according to the embodiments may include information about each tile (for example, coordinate information and height/size information about a bounding box) for one or more tiles. The geometry bitstream may contain a header and a payload. The header of the geometry bitstream according to the embodiments may contain a parameter set identifier (geom_parameter set_id), a tile identifier (geom_tile_id) and a slice identifier (geom_slice_id) included in the GPS, and information about the data contained in the payload. As described above, the metadata processor 12007 according to the embodiments may generate and/or process the signaling information and transmit the same to the transmission processor 12012. According to embodiments, the elements to perform geometry encoding and the elements to perform attribute encoding may share data/information with each other as indicated by dotted lines. The transmission processor 12012 according to the embodiments may perform an operation and/or transmission method the same as or similar to the operation and/or transmission method of the transmitter 10003. Details are the same as those described with reference to FIGS. 1 and 2, and thus a description thereof is omitted.

Figure 13:
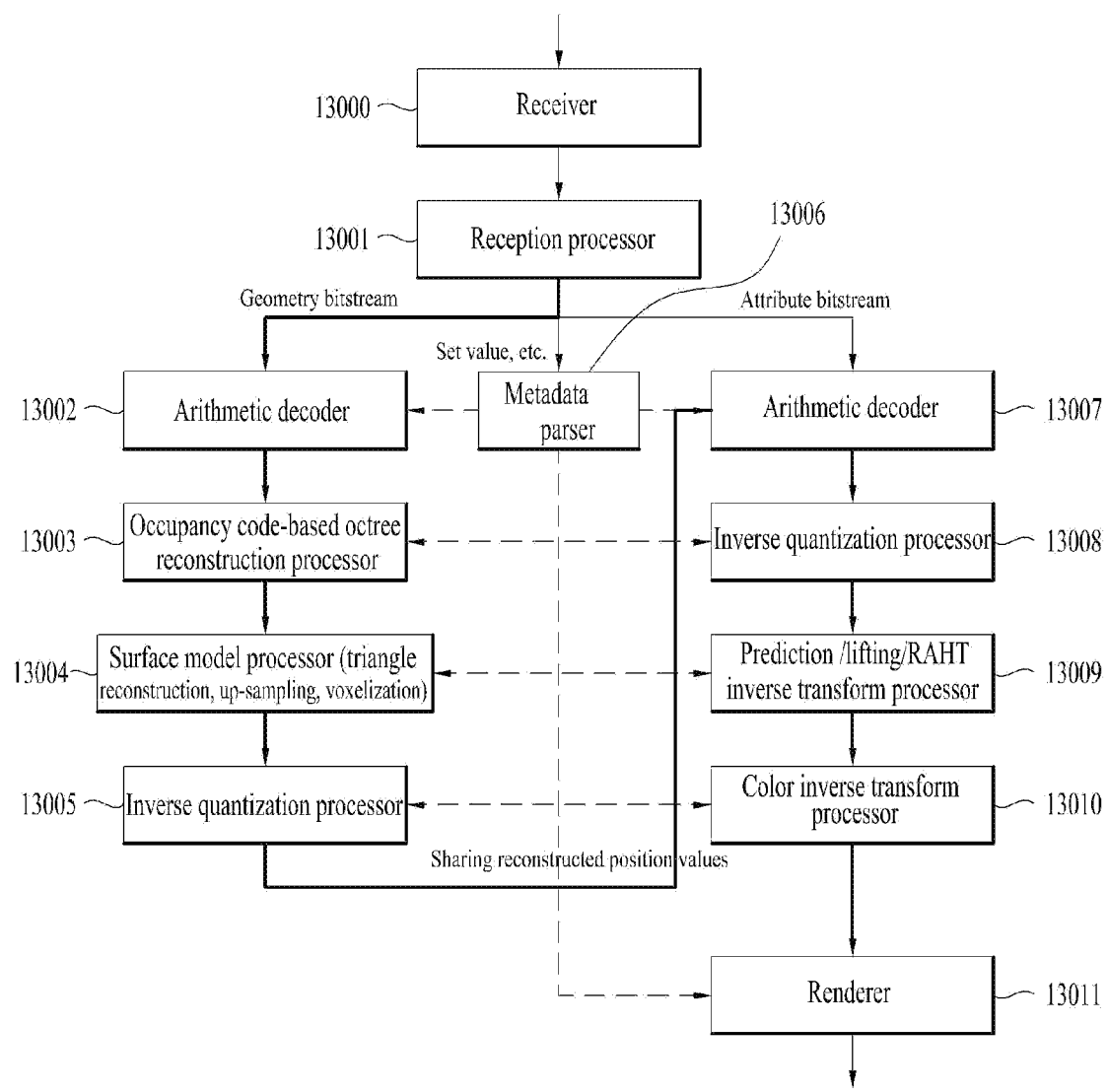
FIG. 13 illustrates a point cloud data reception device according to embodiments.

FIG. 13 illustrates a reception device according to embodiments.

The reception device illustrated in FIG. 13 is an example of the reception device 10004 of FIG. 1 (or the point cloud decoder of FIGS. 10 and 11). The reception device illustrated in FIG. 13 may perform one or more of the operations and methods the same as or similar to those of the point cloud decoder described with reference to FIGS. 1 to 11.

The reception device according to the embodiment may include a receiver 13000, a reception processor 13001, an arithmetic decoder 13002, an occupancy code-based octree reconstruction processor 13003, a surface model processor (triangle reconstruction, up-sampling, voxelization) 13004, an inverse quantization processor 13005, a metadata parser 13006, an arithmetic decoder 13007, an inverse quantization processor 13008, a prediction/lifting/RAHT inverse transform processor 13009, a color inverse transform processor 13010, and/or a renderer 13011. Each element for decoding according to the embodiments may perform a reverse process of the operation of a corresponding element for encoding according to the embodiments.

The receiver 13000 according to the embodiments receives point cloud data. The receiver 13000 may perform an operation and/or reception method the same as or similar to the operation and/or reception method of the receiver 10005 of FIG. 1. A detailed description thereof is omitted.

The reception processor 13001 according to the embodiments may acquire a geometry bitstream and/or an attribute bitstream from the received data. The reception processor 13001 may be included in the receiver 13000.

The arithmetic decoder 13002, the occupancy code-based octree reconstruction processor 13003, the surface model processor 13004, and the inverse quantization processor 13005 may perform geometry decoding. The geometry decoding according to embodiments is the same as or similar to the geometry decoding described with reference to FIGS. 1 to 10, and thus a detailed description thereof is omitted.

The arithmetic decoder 13002 according to the embodiments may decode the geometry bitstream based on arithmetic coding. The arithmetic decoder 13002 performs an operation and/or coding the same as or similar to the operation and/or coding of the arithmetic decoder 11000.

The occupancy code-based octree reconstruction processor 13003 according to the embodiments may reconstruct an octree by acquiring an occupancy code from the decoded geometry bitstream (or information about the geometry secured as a result of decoding). The occupancy code-based octree reconstruction processor 13003 performs an operation and/or method the same as or similar to the operation and/or octree generation method of the octree synthesizer 11001. When the trisoup geometry encoding is applied, the surface model processor 13004 according to the embodiments may perform trisoup geometry decoding and related geometry reconstruction (for example, triangle reconstruction, up-sampling, voxelization) based on the surface model method. The surface model processor 13004 performs an operation the same as or similar to that of the surface approximation synthesizer 11002 and/or the geometry reconstructor 11003.

The inverse quantization processor 13005 according to the embodiments may inversely quantize the decoded geometry.

The metadata parser 13006 according to the embodiments may parse metadata contained in the received point cloud data, for example, a set value. The metadata parser 13006 may pass the metadata to geometry decoding and/or attribute decoding. The metadata is the same as that described with reference to FIG. 12, and thus a detailed description thereof is omitted.

The arithmetic decoder 13007, the inverse quantization processor 13008, the prediction/lifting/RAHT inverse transform processor 13009 and the color inverse transform processor 13010 perform attribute decoding. The attribute decoding is the same as or similar to the attribute decoding described with reference to FIGS. 1 to 10, and thus a detailed description thereof is omitted.

The arithmetic decoder 13007 according to the embodiments may decode the attribute bitstream by arithmetic coding. The arithmetic decoder 13007 may decode the attribute bitstream based on the reconstructed geometry. The arithmetic decoder 13007 performs an operation and/or coding the same as or similar to the operation and/or coding of the arithmetic decoder 11005.

The inverse quantization processor 13008 according to the embodiments may inversely quantize the decoded attribute bitstream. The inverse quantization processor 13008 performs an operation and/or method the same as or similar to the operation and/or inverse quantization method of the inverse quantizer 11006.

The prediction/lifting/RAHT inverse transform processor 13009 according to the embodiments may process the reconstructed geometry and the inversely quantized attributes. The prediction/lifting/RAHT inverse transform processor 13009 performs one or more of operations and/or decoding the same as or similar to the operations and/or decoding of the RAHT transformer 11007, the LOD generator 11008, and/or the inverse lifter 11009. The color inverse transform processor 13010 according to the embodiments performs inverse transform coding to inversely transform color values (or textures) included in the decoded attributes. The color inverse transform processor 13010 performs an operation and/or inverse transform coding the same as or similar to the operation and/or inverse transform coding of the color inverse transformer 11010. The renderer 13011 according to the embodiments may render the point cloud data.

Figure 14:
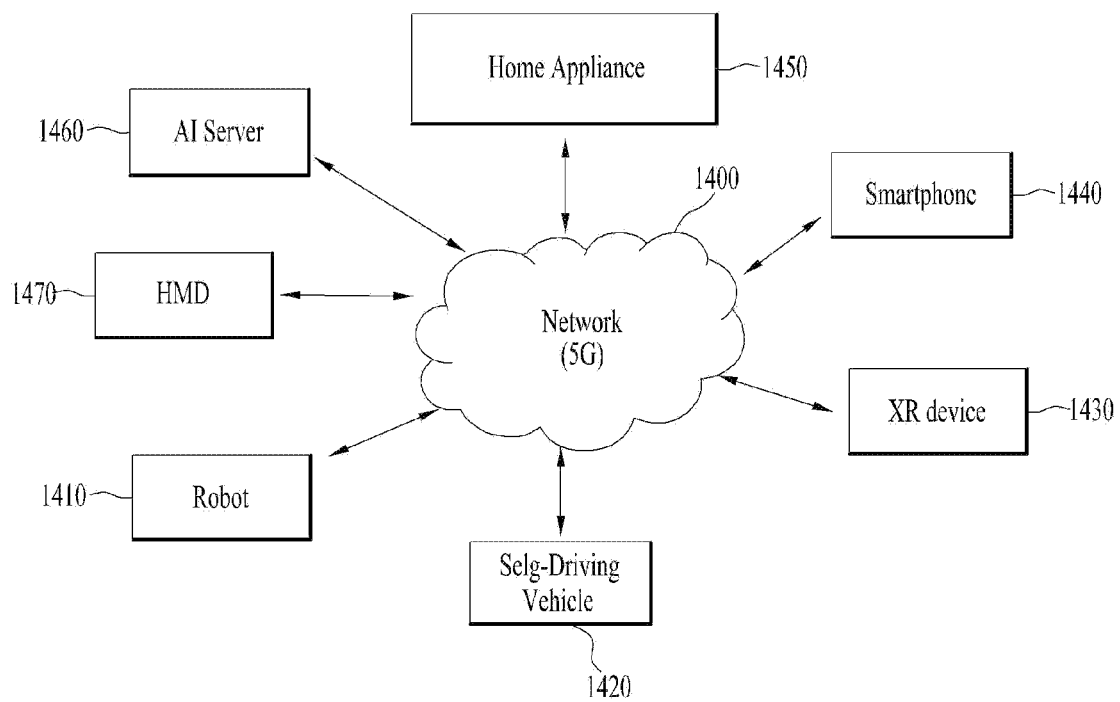
FIG. 14 illustrates an exemplary structure operable in connection with point cloud data transmission/reception methods/devices according to embodiments.

FIG. 14 illustrates an exemplary structure operable in connection with point cloud data transmission/reception methods/devices according to embodiments.

The structure of FIG. 14 represents a configuration in which at least one of a server 1460, a robot 1410, a self-driving vehicle 1420, an XR device 1430, a smartphone 1440, a home appliance 1450, and/or a head-mount display (HMD) 1470 is connected to the cloud network 1400. The robot 1410, the self-driving vehicle 1420, the XR device 1430, the smartphone 1440, or the home appliance 1450 is called a device. Further, the XR device 1430 may correspond to a point cloud data (PCC) device according to embodiments or may be operatively connected to the PCC device.

The cloud network 1400 may represent a network that constitutes part of the cloud computing infrastructure or is present in the cloud computing infrastructure. Here, the cloud network 1400 may be configured using a 3G network, 4G or Long Term Evolution (LTE) network, or a 5G network.

The server 1460 may be connected to at least one of the robot 1410, the self-driving vehicle 1420, the XR device 1430, the smartphone 1440, the home appliance 1450, and/or the HMD 1470 over the cloud network 1400 and may assist in at least a part of the processing of the connected devices 1410 to 1470.

The HMD 1470 represents one of the implementation types of the XR device and/or the PCC device according to the embodiments. The HMD type device according to the embodiments includes a communication unit, a control unit, a memory, an I/O unit, a sensor unit, and a power supply unit.

Hereinafter, various embodiments of the devices 1410 to 1450 to which the above-described technology is applied will be described. The devices 1410 to 1450 illustrated in FIG. 14 may be operatively connected/coupled to a point cloud data transmission/reception device according to the above-described embodiments.

<PCC+XR>

The XR/PCC device 1430 may employ PCC technology and/or XR (AR+VR) technology, and may be implemented as an HMD, a head-up display (HUD) provided in a vehicle, a television, a mobile phone, a smartphone, a computer, a wearable device, a home appliance, a digital signage, a vehicle, a stationary robot, or a mobile robot.

The XR/PCC device 1430 may analyze 3D point cloud data or image data acquired through various sensors or from an external device and generate position data and attribute data about 3D points. Thereby, the XR/PCC device 1430 may acquire information about the surrounding space or a real object, and render and output an XR object. For example, the XR/PCC device 1430 may match an XR object including auxiliary information about a recognized object with the recognized object and output the matched XR object.

<PCC+Self-driving+XR>

The self-driving vehicle 1420 may be implemented as a mobile robot, a vehicle, an unmanned aerial vehicle, or the like by applying the PCC technology and the XR technology.

The self-driving vehicle 1420 to which the XR/PCC technology is applied may represent a self-driving vehicle provided with means for providing an XR image, or a self-driving vehicle that is a target of control/interaction in the XR image. In particular, the self-driving vehicle 1420 which is a target of control/interaction in the XR image may be distinguished from the XR device 1430 and may be operatively connected thereto.

The self-driving vehicle 1420 having means for providing an XR/PCC image may acquire sensor information from sensors including a camera, and output the generated XR/PCC image based on the acquired sensor information. For example, the self-driving vehicle 1420 may have an HUD and output an XR/PCC image thereto, thereby providing an occupant with an XR/PCC object corresponding to a real object or an object present on the screen.

When the XR/PCC object is output to the HUD, at least a part of the XR/PCC object may be output to overlap the real object to which the occupant's eyes are directed. On the other hand, when the XR/PCC object is output on a display provided inside the self-driving vehicle, at least a part of the XR/PCC object may be output to overlap an object on the screen. For example, the self-driving vehicle 1220 may output XR/PCC objects corresponding to objects such as a road, another vehicle, a traffic light, a traffic sign, a two-wheeled vehicle, a pedestrian, and a building.

The virtual reality (VR) technology, the augmented reality (AR) technology, the mixed reality (MR) technology and/or the point cloud compression (PCC) technology according to the embodiments are applicable to various devices.

In other words, the VR technology is a display technology that provides only CG images of real-world objects, backgrounds, and the like. On the other hand, the AR technology refers to a technology that shows a virtually created CG image on the image of a real object. The MR technology is similar to the AR technology described above in that virtual objects to be shown are mixed and combined with the real world. However, the MR technology differs from the AR technology in that the AR technology makes a clear distinction between a real object and a virtual object created as a CG image and uses virtual objects as complementary objects for real objects, whereas the MR technology treats virtual objects as objects having equivalent characteristics as real objects. More specifically, an example of MR technology applications is a hologram service.

Recently, the VR, AR, and MR technologies are sometimes referred to as extended reality (XR) technology rather than being clearly distinguished from each other. Accordingly, embodiments of the present disclosure are applicable to any of the VR, AR, MR, and XR technologies. The encoding/decoding based on PCC, V-PCC, and G-PCC techniques is applicable to such technologies.

The PCC method/device according to the embodiments may be applied to a vehicle that provides a self-driving service.

A vehicle that provides the self-driving service is connected to a PCC device for wired/wireless communication.

When the point cloud data (PCC) transmission/reception device according to the embodiments is connected to a vehicle for wired/wireless communication, the device may receive/process content data related to an AR/VR/PCC service, which may be provided together with the self-driving service, and transmit the same to the vehicle. In the case where the PCC transmission/reception device is mounted on a vehicle, the PCC transmission/reception device may receive/process content data related to the AR/VR/PCC service according to a user input signal input through a user interface device and provide the same to the user. The vehicle or the user interface device according to the embodiments may receive a user input signal. The user input signal according to the embodiments may include a signal indicating the self-driving service.

As described in FIGS. 1 to 14, point cloud data is composed of a set of points, and each of the points may have geometry data (geometry information) and attribute data (attribute information). The geometry data is a three-dimensional position (e.g., coordinate values of x, y, and z axes) of each point. That is, the position of each point is represented by parameters of a coordinate system representing a three-dimensional space (e.g., parameters x, y, and z for three axes representing the space, such as the X-axis, Y-axis, and Z-axis). In addition, the attribute information may represent a color (RGB, YUV, etc.), reflectance, a normal vectors transparency, and the like of a point. The attribute information may be expressed in a scalar or vector form.

According to embodiments, the point cloud data may be classified into category 1 of static point cloud data, category 2 of dynamic point cloud data, and category 3, which is acquired through dynamic movement, according to the type and acquisition method of the point cloud data. Category 1 is composed of a point cloud of a single frame with a high density of points for an object or space. The data of category 3 may be divided into frame-based data having multiple frames acquired through movement and fused data of a fused single frame obtained by matching a point cloud acquired through a LiDAR sensor and a color image acquired as a 2D image for a large space.

According to embodiments, in order to efficiently compress 3D point cloud data having multiple frames according to time, such as frame-based point cloud data having multiple frames, inter prediction coding/decoding may be used. Inter prediction coding/decoding may be applied to geometry information and/or attribute information. Inter prediction is inter-image prediction or inter-frame prediction, and intra prediction is in-image prediction.

Hereinafter, a motion estimation method related to the inter prediction technique will be described.

Inter prediction predicts all or part of the current frame based on information with high similarity to the current frame from the frame on which coding is performed. In this case, a unit for determining the similarity may be referred to as a prediction unit (PU). Inter prediction is a prediction technique using motions between a plurality of frames acquired over time. This technique is called motion vector estimation or motion estimation.

Motion estimation may be divided into global motion estimation, which is performed by rotating, shifting, enlarging, and/or reducing the entire frame, and local motion estimation, which is performed to predict the motion of a part of the frame.

In motion estimation, the space of the current frame may be partitioned into PUs, points included in a corresponding region may be extracted, and points included in the corresponding region of the corresponding reference frame may be extracted. Then, a distance difference and/or a vector difference of between the extracted points of the current frame and the extracted points of the reference frame may be calculated. In this regard, a vector difference less than a specific value is set as a target vector difference.

And, for a unit vector set composed of multiple unit vectors pointing in different directions, each unit vector may be multiplied by an amount, which is an arbitrary value. Thereby, a vector (unit vector x amount) closest (most similar) to the target vector difference may be searched for.

In this case, as the amount gradually decreases from an initial value to a preset minimum value, the above-described similar vector search operation may be repeated several times. A vector finally found through repetition of the search operation may be set as the best vector, and a cost may be calculated using a technique of rate distortion optimization (RDO).

A PU may be divided into multiple sub-prediction units (sub-PU), and the above-described best vector search operation may be performed in the divided sub-PUs. When the sum obtained by calculating the RDO cost of the divided sub-PUs is less than the RDO cost value of the PU, the PU is finally divided into sub-Pus. Otherwise, the best vector of the PU is signaled.

Embodiments disclosed herein relate to encoding and decoding of point cloud data, and particularly, to a device/method for improving efficiency of transmission and reception of point cloud data by searching for relation between multiple frames and continuously encoding/decoding contexts of a reference frame in the encoding/decoding operation. A device/method for transmitting/receiving point cloud data according to embodiments improves compression efficiency of a bitstream based on information related to inter-frame prediction.

Figure 15:
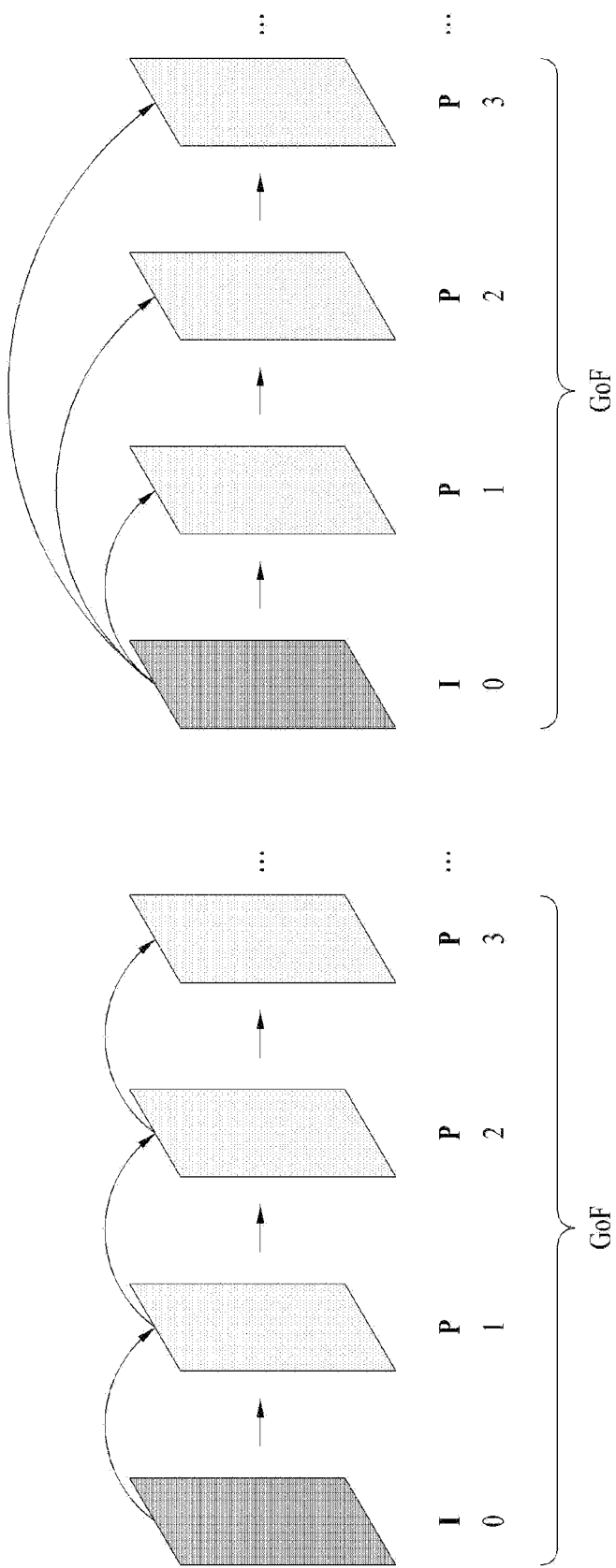
FIG. 15 illustrates examples of Group of Frames (GoF) of point cloud data according to embodiments.

FIG. 15 illustrates examples of Group of Frames (GoF) of point cloud data according to embodiments. GoF represents a group of frames, and may also be referred to as a Group of Pictures (GoP). Frames constituting a GoF include an intra frame (I frame), a predicted frame (P frame), and/or a bidirectional frame (B frame). The intra frame (I frame) represents a frame that does not reference other frames. The I frame is the first frame in the GoF, and therefore it has no previous frame and does not reference other frames. The predicted frame (P frame) represents a frame predicted with reference to a previous I frame or another P frame. The bidirectional frame (B frame) represents a frame predicted by referencing an I frame or a P frame in both directions. For example, when frame 2 references both frame 1 and frame 3 among frames 0 to 3, frame 2 corresponds to a bidirectional frame. A GoF may be composed of an I frame, a P frame, and/or a B frame. A GoF group starting with an I frame may be defined in various forms. Here, the reference frame represents a frame referenced for inter prediction. A GoF is a group of frames starting with an I frame and may be a unit of encoding/decoding.

The point cloud data transmission device/reception device according to the embodiments may replace overlapping information with signaling when inter-frame prediction by searching for inter-frame relation, and a context_continue_flag may be used based on index information representing frames having similar geometry/attribute contexts.

There are two methods of compressing point cloud data: intra-frame coding and inter-frame coding. Category 3 is point cloud data applicable to inter-frame coding and is composed of a set of consecutive frames. This set of frames may be defined as a group of frames (GoF). A GoF may be in the form of IPPP, IPPBPP, IBBPBB, or the like according to a definition method, and may be encoded or decoded.

For example, FIG. 15 shows GoFs in the form of IPPP. In the GoF shown on the left side of FIG. 15, a P frame references the immediately previous frame. That is, P frame 1 references I frame 0, and P frame 2 references P frame 1. In the GoF shown on the right side of FIG. 15, P frames 1 to 3 reference I frame 0. That is, a P frame may reference the previous frame and reference the I frame, the first frame. Alternatively, a P frame may reference the I frame or a specific P frame through frame index information.

Point cloud data is composed of a set of points, and each of the point may include geometry information (geometry) and attribute information (attributes). Encoding of the point cloud data may include compressing the geometry and compressing the attribute information based on geometry reconstructed with position information changed through the compression (reconstructed geometry). Decoding of the point cloud data may include receiving an encoded geometry bitstream and an encoded attribute bitstream, decoding geometry, and decoding attribute information based on the geometry reconstructed through the decoding.

Regarding the point cloud data transmission device/reception device according to the embodiments, a method of signaling related information, such as whether to apply context continuity in encoding/decoding point cloud data is proposed. The point cloud data transmission device/reception device according to the embodiments may derive a related reference frame by discovering the relation between frames, and encode/decode the point cloud data based on the continuity of the context of the reference frame within the GoF. Also, according to embodiments, a method of signaling an index of a reference frame is proposed as an inter-frame encoding/decoding method based on context continuity.

Regarding the point cloud data transmission device/reception device according to the embodiments, proposed herein is a GoF frame structure for increasing compression efficiency of point cloud data. Also, search for a relation between frames within a GoF is proposed. In addition, embodiments propose encoding/decoding of data for which the context continuity of the reference frame is applied in a GoF, and a method of signaling the index of the reference frame in relation to application of the context continuity. Here, the reference frame may represent a frame related to the current frame.

Application of context continuity to frames of a GoF may mean continuously using context information (context model, arithmetic model, probability range information) about a related reference frame during encoding/decoding. In encoding/decoding point cloud data, the point cloud data transmission device/reception device according to the embodiments may search for a relation between the current frame and other frames, and continuously use the context of a frame having the relation, that is, a reference frame. Whether a continuity of the context is available (whether there is a relation between the frames) may be defined inside or outside the GoF structure. In encoding/decoding a current frame, when there is a reference frame related to the current frame, the transmission device/reception device according to the embodiments may encode/decode the current frame based on the context information about the reference frame. That is, the current frame may be encoded/decoded by applying context continuity.

Hereinafter, arithmetic encoding will be described.

Arithmetic encoding is one of the entropy encoding algorithms used for lossless compression. Arithmetic encoding may replace the entire message with a single real number n.

Arithmetic coding may divide a range of 0.0 to 1.0 based on the probability of appearance of symbols appearing in the message. For example, suppose that the probability of appearance of symbol "a" in the message is 60%, the probability of appearance of symbol "b" in the message is 20%, and the probability of appearance of symbol "c" in the message is 20%. In the first step, the range of 0.0 to 1.0 is may be divided into a range of 0.0 to 0.6 representing the probability of appearance of symbol "a", a range of 0.6 to 0.8 representing the probability of appearance of symbol "b", and a range of 0.8 to 1.0 representing the probability of appearance of symbol "c". In this case, the ratio for dividing the probability range such as 0.0 to 1.0 is called a probability model (or probability mode) or a context model.

For example, in applying arithmetic coding to symbol "abc", the first coded symbol is "a", and thus it corresponds to the range of 0.0 to 0.6. In the next step, the range of 0.0 to 0.6 corresponding to "a" is again divided into proportions of 60% 20%, and 20%. Accordingly, the range of 0.0 to 0.6 may be divided into a range of 0.0 to 0.36, a range of 0.36 to 0.48, and a range of 0.48 to 0.6. Next, the second encoded symbol is "b", and thus it corresponds to the range of 0.36 to 0.48. When the range of 0.36 to 0.48 corresponding to "b" is further divided into proportions of 60%, 20%, and 20%, it may be divided into a range of 0.36 to 0.432, a range of 0.432 to 0.456, and a range of 0.456 to 0.48. Then, the third encoded symbol is "c", and thus it corresponds to the range of 0.456 to 0.48. That is, in the arithmetic encoding, a range corresponding to an encoded symbol is divided again according to a probability model or a context model, and then any one of the ranges divided according to the next encoded symbol is selected. By repeating this process, arithmetic encoding is operated.

In the example above, the probability range derived after encoding the message "abc" corresponds to the range of 0.456 to 0.48. Accordingly, the message "abc" may be encoded into a real value within the range. For example, the real number 0.47 may represent "abc". The value of 0.47 is transmitted to the decoder according to the embodiments. The decoder may check a probability range to which the value of 0.47 belongs in the probability range divided according to the context model, and decode the message into a symbol corresponding to the probability range.

For the probability model (or probability mode) or context model, may be a model that is initially determined according to an arithmetic encoding algorithm, or a model configured by checking the probability of appearance of symbols in encoding/decoding. The probability model or the context model may be updated during the encoding/decoding operation.

The point cloud data transmission device/reception device according to the embodiments applies context continuity in encoding/decoding a frame, which means continuously encoding the current frame in a probability range calculated by arithmetic coding of the reference frame. For example, when the probability range derived at last in arithmetic encoding of the reference frame is 0.456 to 0.48, the range from 0.456 to 0.48 may be divided again according to the context model or the probability model to continuously encode the current frame. That is, a probability range or a context model may not be initialized for each frame. Instead, a current frame may be encoded/decoded continuously in a probability range of a reference frame derived through relation search.

In encoding/decoding, the point cloud data transmission device/reception device according to the embodiments may use context-adaptive binary arithmetic coding (CABAC). A context model (or probability mode) used for frame arithmetic encoding may be initialized for each frame, or a probability mode used in a related reference frame may be reused in the current frame. In addition, the current frame may be encoded continuously in the probability range derived from the related reference frame, or may be decoded using the probability range information. In the case where frames have similar characteristics, inter-symbol redundancy may be utilized by reusing the probability mode. Thereby, the compression efficiency may be increased. Using the same probability mode as the probability mode used in the reference frame has the same meaning as using the context model of the reference frame. Even in arithmetic coding, Huffman coding, or range coding other than CABAC, the probability mode or context model of the reference frame may be reused based on inter-frame relation search.

The point cloud data transmission device/reception device according to the embodiments may determine the inter-frame relation as follows.

Inter-frame relation may be determined differently according to the types of frames constituting a GoF. For example, the I frame is the first frame in the group, it may be determined that the I frame has no related reference frame, and that there is no context model that may be used continuously. A P frame referencing the I frame may be predicted through motion estimation and motion compensation of the I frame, and thus it may be determined that the P frame has low relation to the I frame. On the other hand, for two different P frames predicted from the same I frame, it may be determined that the relation between the P frames is high.

In addition, the inter-frame relation may be determined based on a difference in global motion vector between the current frame and the previous frame. A global motion vector is a motion vectors for the entire point cloud data included in the frame. By comparing the global motion vector difference between frames with a specific threshold that is set arbitrarily, it may be determined whether the frames are related. In the same manner, the inter-frame relation may be determined based on a difference in local motion vectors between the current frame and the previous frame. A local motion vector is a motion vector for some objects in a frame. By comparing the sum of the differences of the local motion vectors between frames with a specific threshold that is set arbitrarily, the inter-frame relation may be determined.

The inter-frame relation may be determined based on a rate-distortion optimization (RDO) value between point, geometry, and/or attribute values of the previous frame and the current frame. In addition, the inter-frame relation may be determined based on the amount of change in motion vector or motion compensated value of a road or other object between the previous frame and the current frame.

The previous frame may refer to a frame immediately preceding the current frame, or may refer to a frame earlier than the immediately preceding frame. Information on a reference frame that is highly related with the current frame may be transmitted to the point cloud data reception device according to the embodiments as an index. When a probability model of the reference frame that is highly related with the current frame is continuously used in encoding the current frame, the index of the reference frame with high relation may be transmitted to the decoder, and the decoder may decode the current frame based on the received index.

The point cloud data transmission device/reception device according to the embodiments may encode/decode the current frame by sharing a context model or a probability model of a reference frame that is related to the current frame. The encoder may encode the geometry information and attribute information about the current frame by continuously using the context of the related reference frame. The decoder may decode the current frame using the continuously used context of the related reference frame.

When the context or probability model of the related reference frame is continuously used, the point cloud data transmission device/reception device according to the embodiments may transmit/receive index information indicating a frame whose context or probability model is used. The index of the related reference frame may be determined based on the distance from the current frame to the reference frame, the distance from the I frame to the reference frame, or the number of frames from the start frame.

Figure 16:
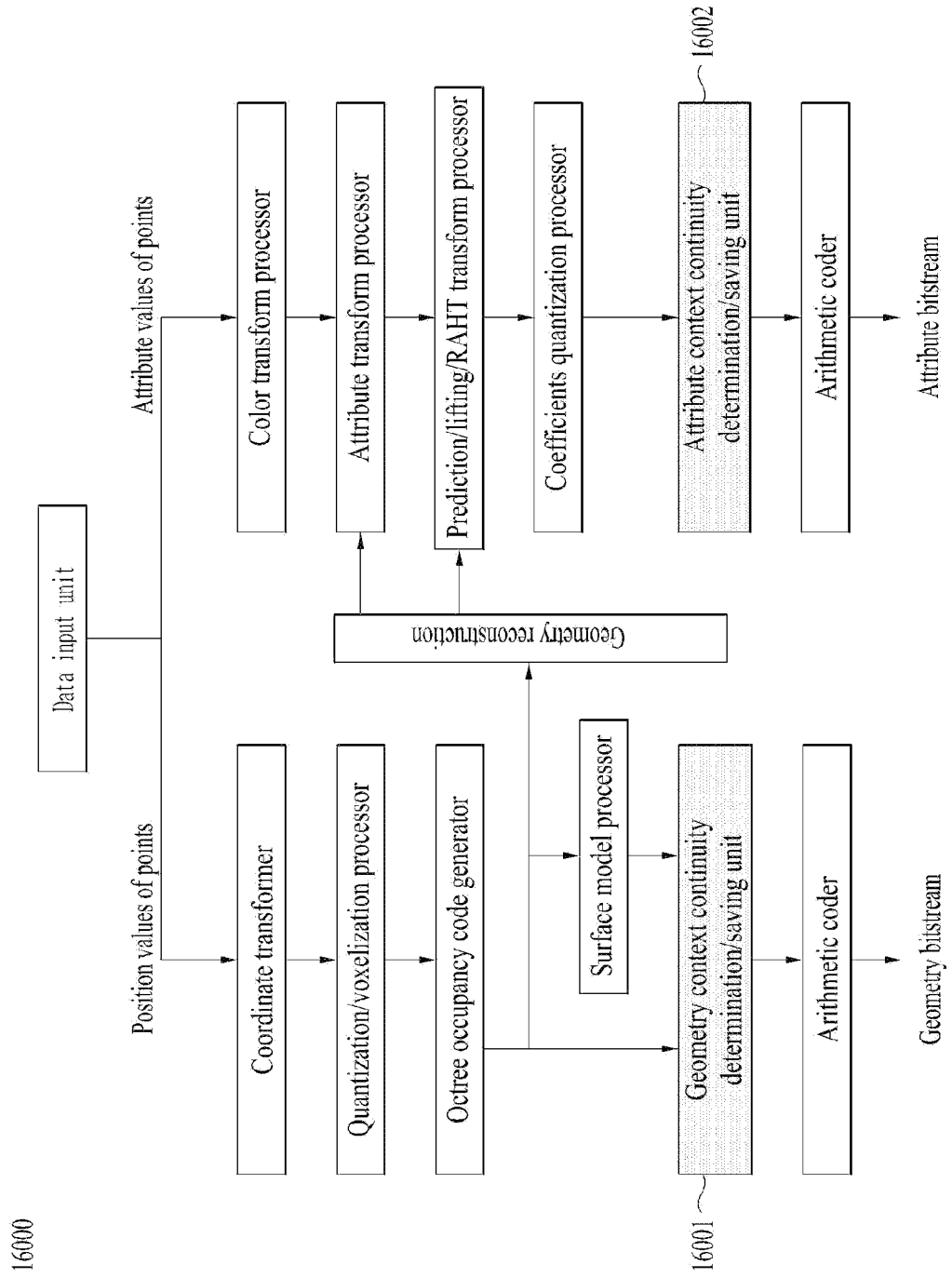
FIG. 16 illustrates a point cloud data transmission device according to embodiments.

FIG. 16 illustrates a point cloud data transmission device 16000 according to embodiments.

The point cloud data transmission device 16000 (e.g., the point cloud encoder or transmission device described with reference to FIG. 1, 4, 12 or 18) according to the embodiments may perform the encoding operation described with reference to FIGS. 1 to 14. Although not shown in FIG. 16, the point cloud data transmission device 16000 may further include one or more components to perform the encoding operation described with reference to FIGS. 1 to 14.

The point cloud data transmission device 16000 (e.g., the encoder or transmission device described in FIG. 1, 4, 12 or 18) according to the embodiments may include a context continuity determination/saving unit. The context continuity determination/saving unit includes a geometry context continuity determination/saving unit 16001 and an attribute context continuity determination/saving unit 16002.

The context continuity determination/saving unit determines whether context continuity is applied to the current frame to be encoded. In this case, whether the context continuity is applied may be determined by whether there is a reference frame related to the current frame. When there is a related reference frame, the current frame may be encoded by applying the context continuity. The context continuity determination/saving unit derives the reference frame related to the current frame through inter-frame relation search. In addition, the context continuity determination/saving unit may transmit index information representing a reference frame in which context information (at least one of probability range information, context model or probability model information) is continuously used, and information about whether context continuity is applied to the point cloud data reception device (e.g., the decoder or reception device of FIG. 1, 10, 11, or 19) according to the embodiments.

The context continuity determination/saving unit may signal an index of a reference frame in which context continuity is used, and an index of a current frame. Index information representing a related reference frame in the geometry information encoding operation may be different from index information representing a related reference frame in the attribute information encoding operation. Also, the context continuity determination/saving unit may save context information (at least one of probability range information, context model information, and probability model information) derived according to arithmetic encoding of the reference frame. Therefore, the arithmetic coder according to the embodiments may continuously use the probability range and context model of the reference frame during arithmetic encoding of the current frame. That is, the arithmetic coder may use context continuity.

Figure 17:
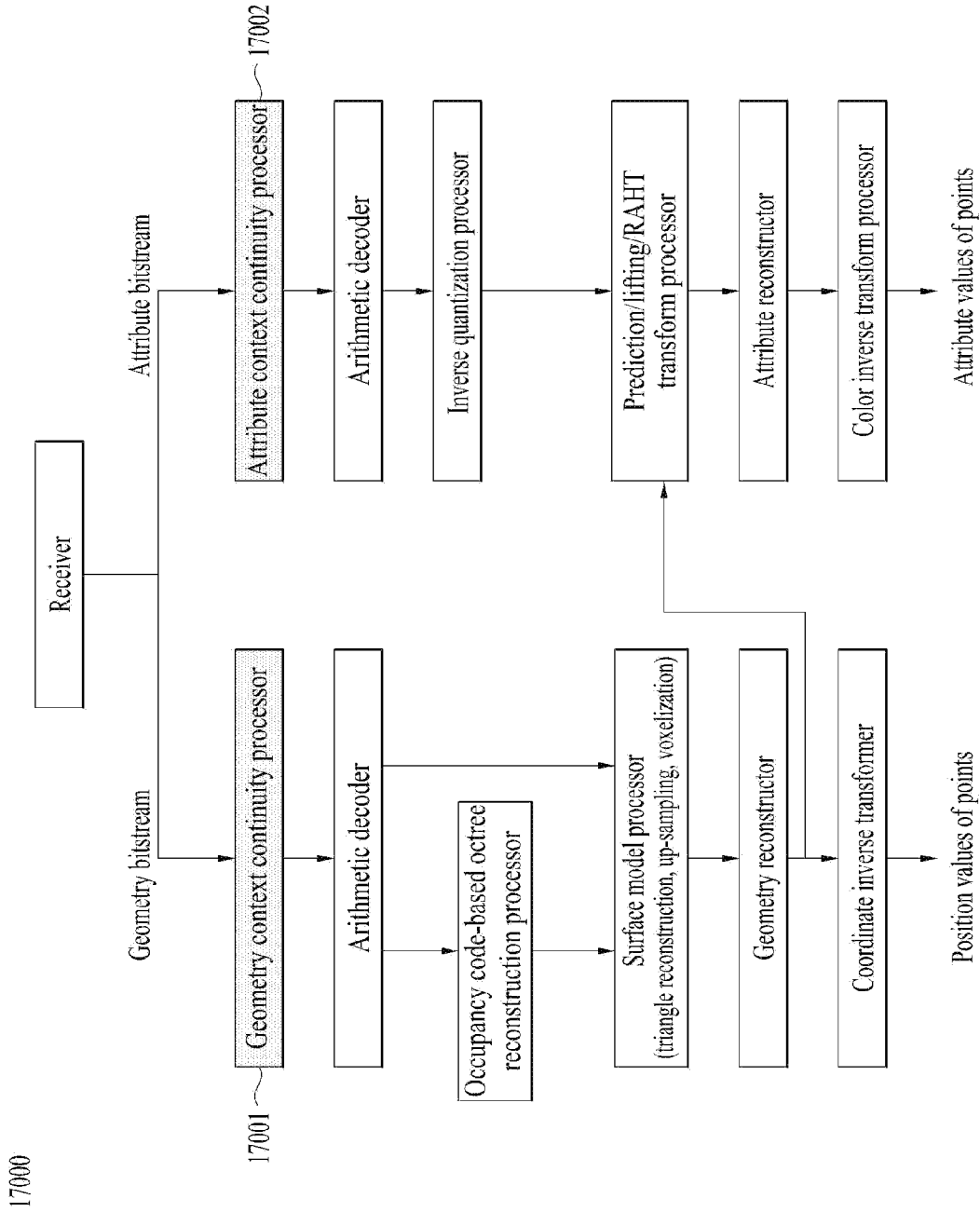
FIG. 17 illustrates a point cloud data reception device according to embodiments.

FIG. 17 illustrates a point cloud data reception device 17000 according to embodiments.

The point cloud data reception device 17000 (e.g., the point cloud decoder or receiver described with reference to FIG. 1, 10, 11 or 19) according to the embodiments may perform the decoding operation described with reference to FIGS. 1 to 14. Also, the point cloud data reception device 17000 may perform a decoding operation corresponding to a reverse process of the encoding operation of the point cloud data transmission device 16000 described with reference to FIG. 16. Although not shown in FIG. 17, the point cloud data reception device 17000 may further include one or more components to perform the decoding operation described with reference to FIGS. 1 to 14.

The point cloud data reception device 17000 may include a context continuity processor. The context continuity processor includes a geometry context continuity processor 17001 and an attribute context continuity processor 17002.

The point cloud data reception device 17000 may decode geometry information or attribute information based on index information representing a current frame using context continuity and index information representing a reference frame. That is, the reception device 17000 may decode the point cloud data of the current frame based on the context information (such as a probability range, a context model, or a probability model) about the reference frame corresponding to the received index information. The reconstruction of the geometry information or the attribute information may correspond to the reverse process of the operations performed by the geometry context continuity determination/saving unit 16001 and the attribute context continuity determination/saving unit 16002 of FIG. 16.

The context continuity processor according to embodiments determines whether context continuity is applied to a frame of point cloud data. The point cloud data reception device 17000 receives a bitstream including index information representing a reference frame or information about whether context continuity of a frame is applied. The context continuity processor may determine whether context continuity is applied to the current frame based on the received information. Whether context continuity is applied may be determined by whether there is a reference frame related to the current frame. When there is index information representing the reference frame, the context continuity processor may determine that context continuity is applied to the current frame. When context continuity is applied to the current frame, the reception device 17000 may decode the current frame based on the context information (such as probability range, context model, or probability model) about the reference frame. Also, the context continuity processor may save context information of a frame. The saved context information may be used when the reception device 17000 decodes another frame.

Figure 18:
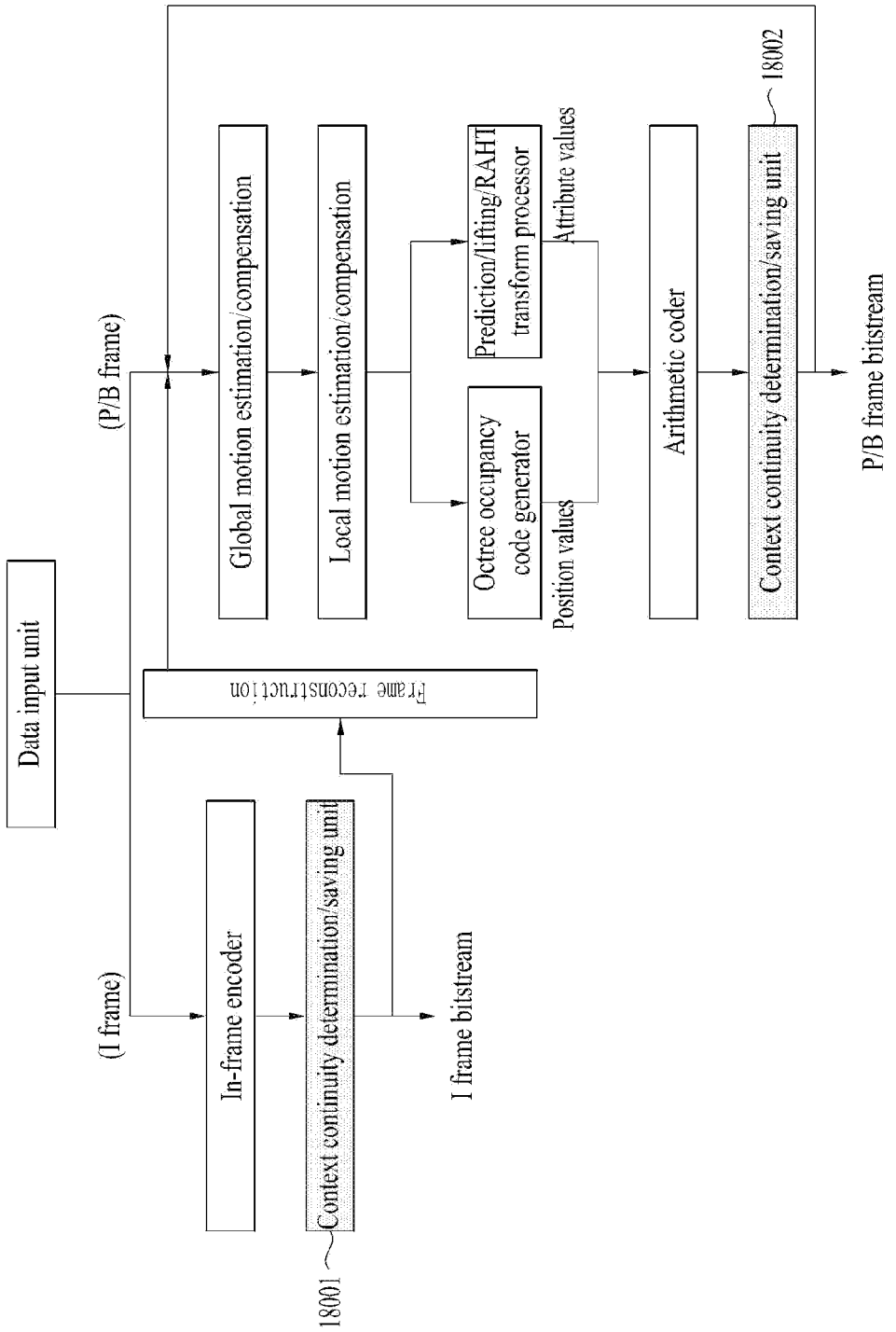
FIG. 18 illustrates a point cloud data transmission device according to embodiments.

FIG. 18 illustrates a point cloud data transmission device 18000 according to embodiments.

The point cloud data transmission device 18000 (e.g., the point cloud encoder or transmission device described with reference to FIG. 1, 4, 12 or 16) according to the embodiments may perform the encoding operation described with reference to FIGS. 1 to 16. Although not shown in FIG. 18, the point cloud data transmission device 18000 may further include one or more components to perform the encoding operation described with reference to FIGS. 1 to 16.

The point cloud data transmission device 18000 (e.g., the encoder or transmission device described with reference to FIG. 1, 4, 12 or 16) may include context continuity determination/saving units 18001 and 18002. The context continuity determination/saving units 18001 and 18002 is the same as that of FIG. 16, and thus a description thereof will be omitted.

Referring to FIG. 18, global motion estimation/compensation or local motion estimation/compensation from an I frame may be performed to predict a P frame or a B frame. The context continuity determination/saving units 18001 and 18002 search inter-frame relation to derive a reference frame for the current frame, and the arithmetic coder may save context information (such as probability range information, a context model or probability model) used in arithmetic encoding. The saved context information may be used when the arithmetic coder decodes a frame. That is, the current frame may be continuously encoded with contexts based on the saved context information about the reference frame.

Figure 19:
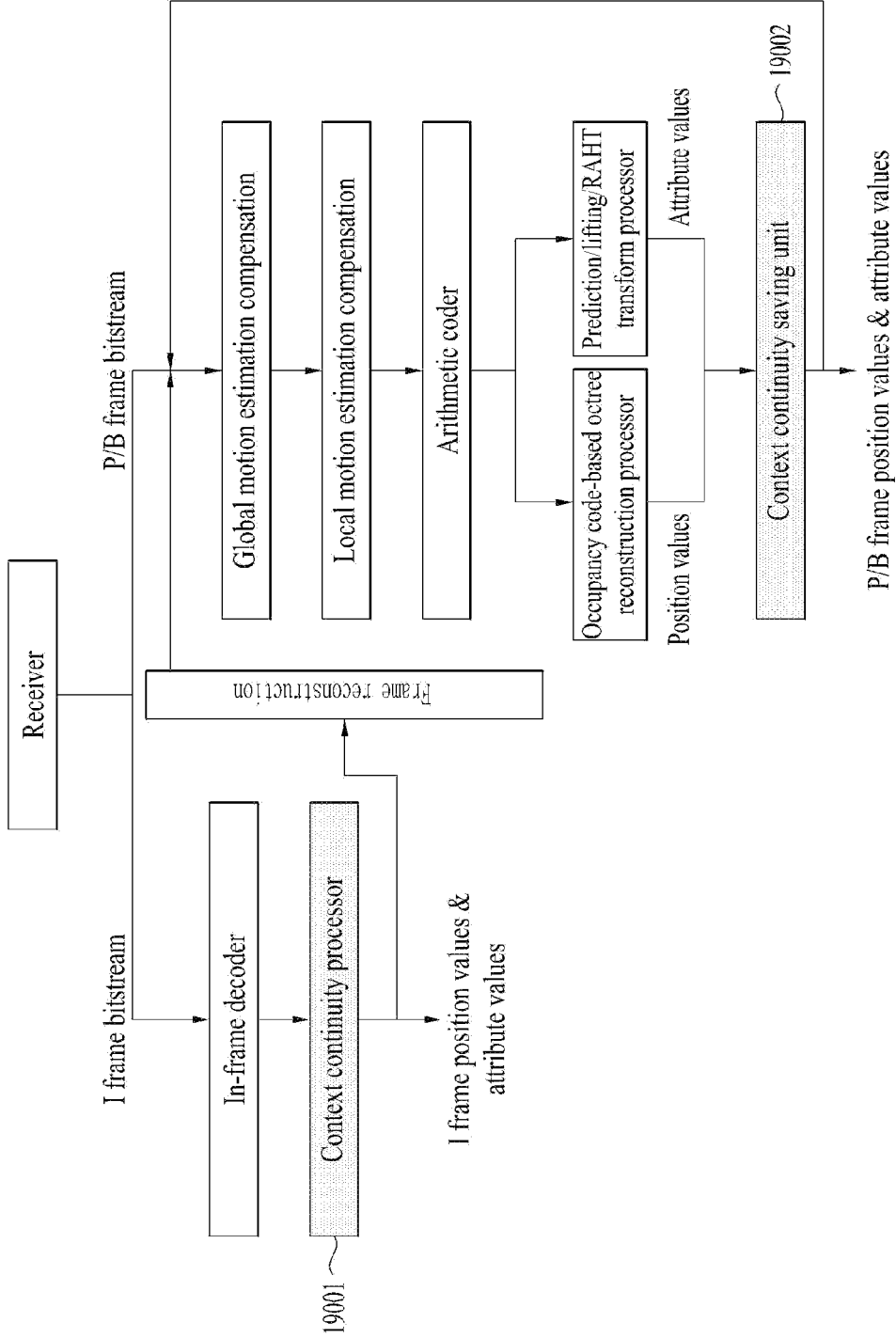
FIG. 19 illustrates a point cloud data reception device according to embodiments.

FIG. 19 illustrates a point cloud data reception device 19000 according to embodiments.

The point cloud data reception device 19000 (e.g., the point cloud decoder or reception device described in FIGS. 1, 10, 11, or 17) according to the embodiments may perform the decoding operation described with reference to FIGS. 1 to 17. Also, the point cloud data reception device 19000 may perform a decoding operation corresponding to a reverse process of the encoding operation of the point cloud data reception device 17000 described with reference to FIG. 17. Although not shown in FIG. 19, the point cloud data reception device 19000 may further include one or more components to perform the decoding operation described with reference to FIGS. 1 to 17.

The point cloud data reception device 19000 may include context continuity processors 19001 and 19002. The receiver 19000 may decode geometry information or attribute information based on index information representing the current frame and index information representing a reference frame. The reception device 19000 may derive context information (such as a probability range, a context model, or a probability model) used for decoding of the reference frame through the index information representing the received reference frame. The reception device 19000 may decode point cloud data of the current frame based on context information about the reference frame.

The context continuity processors 19001 and 19002 of FIG. 19 may correspond to the context continuity processors of FIG. 17.

The context continuity processors according to embodiments determine whether context continuity is applied to a frame of the point cloud data. The point cloud data reception device 19000 receives a bitstream including index information representing a reference frame or information about whether context continuity of a frame is applied. The context continuity processors may determine whether context continuity is applied to the current frame based on the received information. Whether the context continuity is applied may be determined by whether there is a reference frame related to the current frame. When there is index information representing the reference frame, the context continuity processors may determine that context continuity is applied to the current frame. When context continuity is applied to the current frame, the reception device 19000 may decode the current frame based on the context information (such as a probability range, a context model, or a probability model) of the reference frame. Also, the context continuity processors may save context information about a frame. The saved context information may be used when the reception 19000 decodes another frame.

Figure 20:
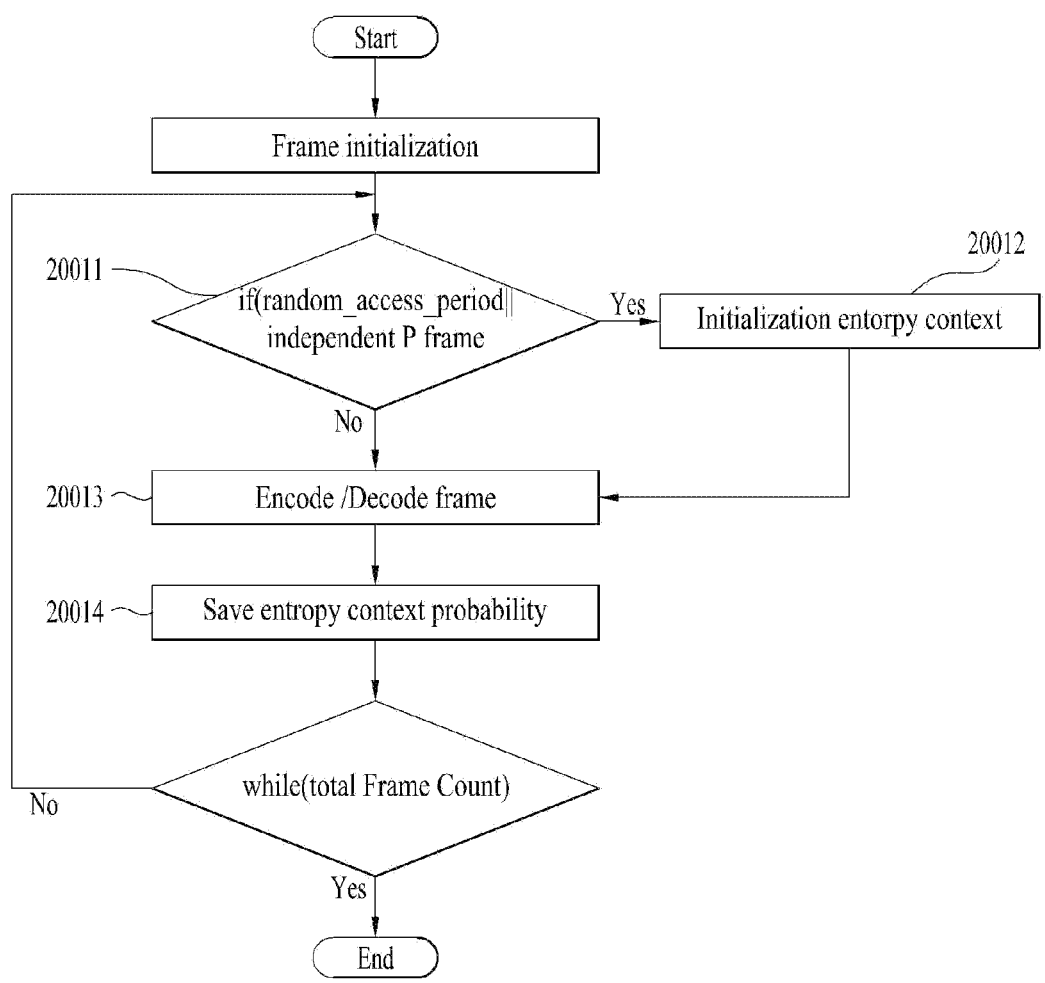
FIG. 20 illustrates an encoding/decoding procedure of point cloud data according to embodiments.

FIG. 20 illustrates an encoding/decoding procedure of point cloud data according to embodiments. Referring to FIG. 20, in encoding/decoding of point cloud data, it is determined whether context continuity is applied (20011), and the point cloud data is encoded/decoded based on whether or not the context continuity is applied (20013). Then, the context information is saved (20014).

In determining whether the context continuity is applied, it is checked whether the current frame is a dependent P frame (or a dependent frame). The "if" statement checks whethe the frame corresponds to random_access_period or an independent P frame. When the frame meets any one of the two conditions, the frame does not correspond to a dependent P frame. random_access_period indicates an I frame, and an independent P frame indicates that the P frame is an independent P frame (or an independent frame) having no relation with other frames. When one of the two conditions is satisfied, the current frame is not a dependent P frame, and therefore a reference frame related to the current frame is not present in the previous frame. In this case, the entropy context may be initialized (Initialize entropy context, 20012), and the current frame may be encoded or decoded according to the initialized context information (20013). The initialization of the entropy context means encoding or decoding of a frame to which context continuity is not applied. The entropy context may mean a context model, a probability model, or a probability range.

From the perspective of the transmission device (the transmission device of FIG. 16 or 18, or the like) according to the embodiments, whether context continuity is applied may be determined according to whether there is a related reference frame by determining a relation between frames. When the current frame is a dependent P frame, a reference frame related to the previous frame exists, and context continuity may be applied.

In addition, from the perspective of the reception device (the reception device of FIGS. 17 and 19, or the like) according to the embodiments, whether context continuity is applied may be determined based on information generated/received from the transmission device according to the embodiments. That is, the reception device may determine whether the context continuity is applied to the current frame based on the received information on whether the context continuity is applied, the index information representing the reference frame, and the like.

When the current frame does not correspond to random_access_period or an independent P frame, the current frame corresponds to a dependent P frame. The dependent P frame has a reference frame related to the previous frame. When the current frame is a dependent P frame, the current frame is encoded or decoded without initializing the entropy context (20013). Since the entropy context is not initialized, the current frame is encoded or decoded, continuously using the context of the previous reference frame. That is, the current frame may be encoded or decoded based on the context information about the reference frame.

Next, the entropy context probability is saved (20014). The entropy context probability may represent context information. The context information represents a context model, a probability model, or a probability range. The saved entropy context probability may be used in encoding or decoding another frame. Since the encoding or decoding procedure in FIG. 20 is repeated as many times as the number of frames, the procedure ends when encoding or decoding is performed on all frames.

FIG. 21 shows efficiency of encoding of point cloud data according to embodiments. Referring to FIG. 21, point cloud data encoding using context continuity according to the embodiments shows a gain of 2.5% in the C2-lossy operation.

FIG. 22 shows efficiency of encoding of point cloud data according to embodiments. Referring to FIG. 22, point cloud data encoding using context continuity according to the embodiments shows a gain of 0.4% in the CW-lossless operation.

On the other hand, an entropy continuing slice method is used in the low-latency scenario of intra-frame coding of TMC13[1]. The present disclosure discloses a dependent P frame by continuation of entropy. This method shows the possibility of improving the compression rate by continuing the entropy state probability for P frames in a GoF. As shown in FIGS. 21 and 22, the experimental results of this method show a gain of 2.5% in C2 and 0.4% in CW in the current structure of InterEMV1.0. The entropy continuing slice method is a method of encoding or decoding of a frame to which context continuity is applied according to embodiments.

The present disclosure describes the entropy continuation method of inter-frame coding. Currently, InterEMV1.0 supports global and local motion estimation compensation. After adjusting the motion, the occupancy bits of the current frame are predicted by the reference frame and coded by entropy coding. Since all P frames of the GoF are coded as motion applied reference frames, the use of dependent P frames is introduced. The entropy continuation may represent a context continuation.

Intra-frame coding of Cat3 initializes the entropy state in all frames corresponding to a single slice. However, in inter-frame coding, each frame is linked with global/local motion and inter-occupancy prediction. Considering the properties of these links, a P dependent frame using the previous entropy is introduced. The P dependent frame is introduced for the following reasons.

1. Cat3 frame data sets mostly consist of a single slice of a single frame. In very sparse data sets, it is likely that each frame consists of a few points.

2. Use cases where compression is preferred over parallelization at the frame level. Parallel decoding is used in the GoF and requires more links in the GoF.

In the I/P frame structure, the loss of a P frame causes a loss in every frame until the next reference frame appears. In terms of supporting random access, in which frame loss is inevitable, it is proposed to study P (dependent/independent entropy) and B frames according to whether it is possible to share the entropy state.

For parallel decoding, GoF level parallel decoding is supported. However, in the current structure, flexibility of parallel decoding is not yet supported in P frames. First, a unit constituting a GoF should be defined. In addition, consideration of frame-level parallel decoding will be discussed. A dependent P frame and an independent P frame each have an advantage for compression and parallelization. Therefore, a method of taking advantage between compression and parallelization by introducing a dependent P frame and an independent P frame is discussed.

Figure 23:
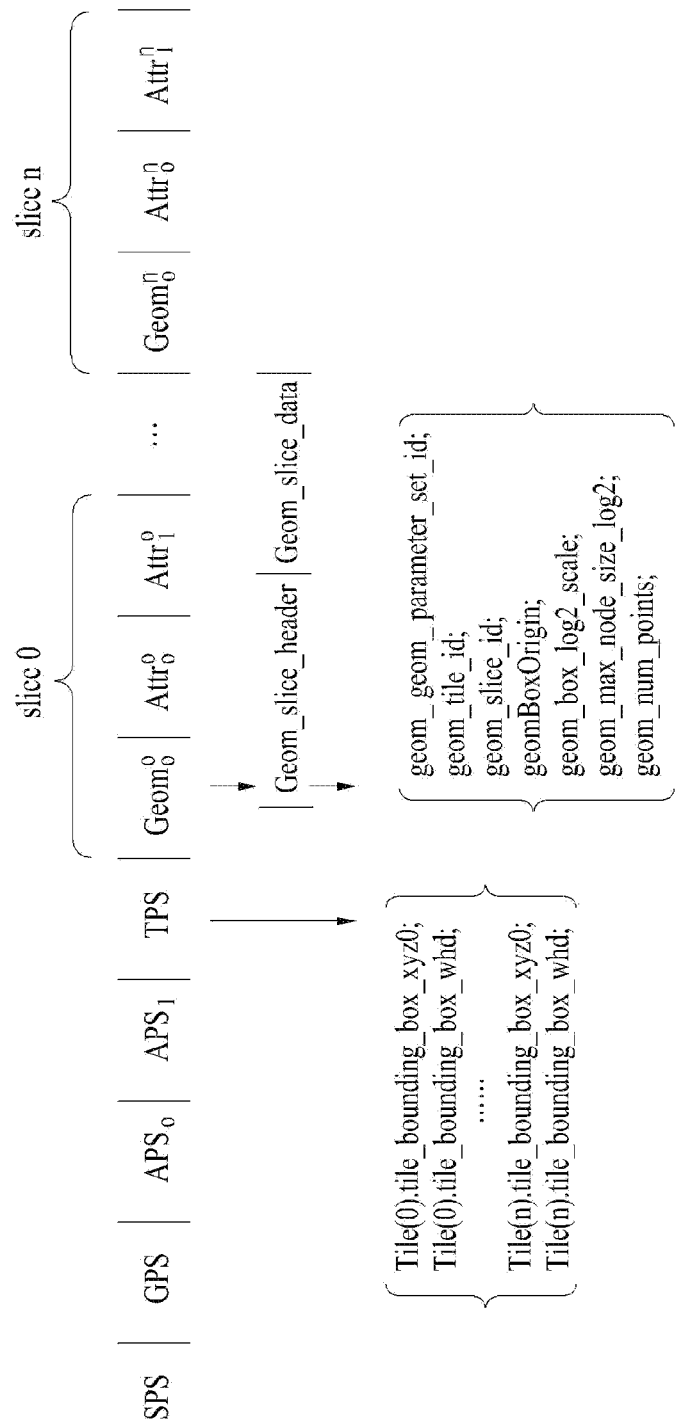
FIG. 23 shows an example of encoded point cloud data according to embodiments.

FIG. 23 shows an example of encoded point cloud data according to embodiments. The point cloud video encoder 10002 according to the embodiments may encode point cloud data in the encoding operation 20001, and the transmitter 10003 according to the embodiments may transmit a bitstream including the encoded point cloud data to the reception device 10004 according to the embodiments.

The encoded point cloud data (bitstream) according to the embodiments may be generated by hardware including one or more processors or integrated circuits configured to communicate with the point cloud video encoder 10002 of FIG. 1, the encoding 20001 of FIG. 2, the encoder of FIG. 4, the transmission device of FIG. 12, the XR device 1430 of FIG. 14, and the transmission device of FIG. 16 or 18, and/or one or more memories, software, firmware, or a combination thereof.

Also, the encoded point cloud data (bitstream) according to the embodiments may be decoded by hardware including one or more processors or integrated circuits configured to communicate with the point cloud video decoder 10006 of FIG. 1, the decoding 20003 of FIG. 2, the decoder of FIG. 11, the transmission device of FIG. 13, the XR device 1430, the reception device of FIGS. 17 and 19, and/or one or more memories, software, firmware, or a combination thereof.

The abbreviations shown in FIG. 23 have the following meanings.

SPS: Sequence Parameter Set;
GPS: Geometry Parameter Set;
APS: Attribute Parameter Set;
TPS: Tile Parameter Set;
Geom: Geometry bitstream=geometry slice header+geometry slice data;
Attr: Attribute bitstream=attribute brick header+attribute brick data.

A tile or slice region may be provided such that the point cloud data may be divided into regions and processed. When the point cloud data is divided into regions, the importance of each region may be set differently. Accordingly, by allowing different filters or different filter units to be applied according to importance, a filtering method having high complexity but good result quality may be used for an important region.

In addition, instead of using a complex filtering method for the entire point cloud data, a different filtering method may be applied to each region (divided into tiles or slices) depending on the processing capacity of the reception device. Therefore, an improved image quality for important regions and appropriate latency for the system may be ensured. That is, when the region of the point cloud data is divided into tiles, a different filter or a different filter unit may be applied to each tile. Also, when the region of the point cloud data is divided into slices, a different filter or a different filter unit may be applied to each slice.

Hereinafter, parameters (metadata, signaling information, etc.) according to the embodiments may be generated during the process of the transmission device according to the embodiments, and may be transmitted to the reception device according to the embodiments. For example, the parameters according to the embodiments may be generated by the metadata processor (or metadata generator) of the transmission device according to the embodiments, and may be acquired by the metadata parser of the reception device according to the embodiments.

The point cloud data transmission device (e.g., the encoder or transmission device described with reference to FIG. 1, 4, 12, 16, or 18) according to the embodiments may signaled, to the reception device, context continuity application information related to geometry information and attribute information, index information representing a current frame, and index information representing a reference frame.

FIG. 24 shows an example of syntax of a sequence parameter set according to embodiments. Context continuity structure information may be added to the SPS and signaled.

frameIdx indicates an index representing the position of the current frame in the sequence.

context_continue_flag indicates whether context continuity is applied to both geometry information and attribute information. context_continue_flag equal to TRUE indicates that the current frame continuously uses the context of the previous frame (context continuity is applied). context_continue_flag equal to FALSE indicates that the current frame does not continuously use the context of the previous frame (context continuity is not applied).

context_continue_use_frameIdx indicates an index of a frame (reference frame) in which context continuity is used among previous frames. The index of the reference frame may be indicated based on the distance from the current frame to the frame (reference frame) in which context continuity is used, the distance from the first frame to the reference frame, or the order of consecutive P frames up to the reference frame.

FIG. 25 shows an example of syntax of a tile parameter set according to embodiments. Context continuity structure information may be added to the TPS and signaled.

tile_ctr indicates an index representing a sequential position of the current tile among all tiles.

tile_context_continue_flag indicates whether context continuity is applied on a tile basis. It may indicate whether context continuity is applied to both geometry information and attribute information. tile_context_continue_flag equal to TRUE indicates that the current frame continuously uses the context of the previous frame. tile_context_continue_flag equal to FALSE indicates that the current frame does not continuously use the context of the previous frame.

tile_context_continue_use_tileIdx indicates an index of a tile (reference tile) in which context continuity is used among previous tiles. The index of the reference tile may be signaled based on the distance from the current tile to the reference tile or the distance from the first tile to the reference tile.

FIG. 26 shows an example of syntax of a geometry parameter set according to embodiments. Context continuity structure information may be added to the GPS and signaled.

frameIdx indicates an index representing the position of the current frame in the sequence.

geometry_context_continue_flag indicates whether context continuity is applied on a geometry basis. geometry_context_continue_flag equal to TRUE indicates that the geometry of the current frame continuously uses the context of the geometry of the previous frame. geometry_context_continue_flag equal to FALSE indicates that the geometry of the current frame does not continuously use the context of the geometry of the previous frame.

geometry_context_continue_use_frameIdx indicates an index of a frame (reference frame) in which context continuity is used among previous frames. The index of the reference frame may be signaled based on the distance from the current frame to the reference frame or the distance from the first frame to the reference frame.

FIG. 27 shows an example of syntax of an attribute parameter set according to embodiments. Context continuity structure information may be added to the APS and signaled.

frameIdx indicates an index representing the position of the current frame in the sequence.

attribute_context_continue_flag indicates whether context continuity is applied on an attribute basis. attribute_context_continue_flag equal to TRUE indicates that the attribute of the current frame continuously uses the context of the attribute of the previous frame. attribute_context_continue_flag equal to FALSE indicates that the attribute of the current frame does not continuously use the context of the attribute of the previous frame.

attribute_context_continue_use_frameIdx indicates the index of a frame (reference frame) in which context continuity is used among previous frames. The index of the reference frame may be signaled based on the distance from the current frame to the reference frame or the distance from the first frame to the reference frame.

FIG. 28 shows an example of syntax of a slice header of a geometry bitstream according to embodiments. Context continuity structure information may be added to the slice header of Geom and signaled.

gsh_slice_id indicates a slice index representing the position of the current slice.

geometry_slice_context_continue_flag indicates whether context continuity is applied on a geometry slice basis. geometry_slice_context_continue_flag equal to TRUE indicates that the current slice continuously uses the context of the previous slice. geometry_slice_context_continue_flag equal to FALSE indicates that the current slice does not continuously use the context of the previous slice.

geometry_slice_context_continue_use_frameIdx indicates an index of a slice (reference slice) in which context continuity is used among previous slices. The index of the reference slice may be signaled based on the distance from the current slice to the reference slice or the distance from the first slice to the reference slice.

Figure 29:
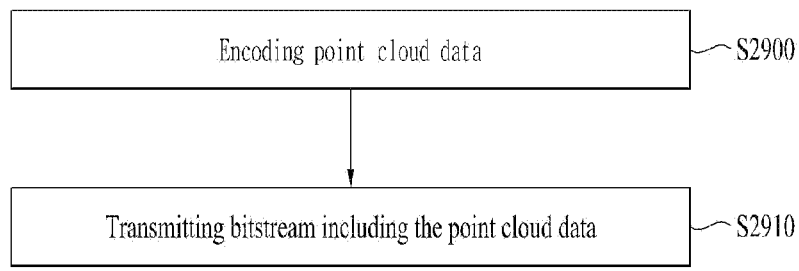
FIG. 29 illustrates a method of transmitting point cloud data according to embodiments.

FIG. 29 illustrates a method of transmitting point cloud data according to embodiments. The method of transmitting point cloud data includes encoding point cloud data (S2900) and transmitting a bitstream including the point cloud data (S2910). Also, the encoding S2900 of the point cloud data may include encoding geometry data of the point cloud data and encoding attribute information of the point cloud data.

In the encoding S2900 of the point cloud data, the point cloud data may be encoded by hardware including one or more processors or integrated circuits configured to communicate with the point cloud video encoder 10002 of FIG. 1, the encoding 20001 of FIG. 2, the encoder of FIG. 4, the transmission device of FIG. 12, the XR device 1430 of FIG. 14, and the transmission device of FIG. 16 or 18, and/or one or more memories, software, firmware, or a combination thereof.

In the transmitting 2910 of the bitstream including the point cloud data, the point cloud data may be transmitted by hardware including one or more processors or integrated circuits configured to communicate with the transmitter 10003 of FIG. 1, the transmission processor 12012 of FIG. 12, the XR device 1430 of FIG. 14, the transmission device of FIG. 16 or 18, and/or one or more memories, software, firmware, or a combination thereof.

The encoding S2900 of the point cloud data may include determining whether context continuity of the point cloud data is applied to the current frame, encoding the current frame in response to whether the context continuity is applied, and saving a context of the current frame.

To determine whether context continuity is applied to a frame, previous frames may be searched for a reference frame according to the relation between the frames. In this case, the inter-frame relation search may be performed based on the frame type (e.g., I-frame or P-frame, etc.). Also, determination of the inter-frame relation may be performed based on a difference in motion vector between frames. Also, the inter-frame relation determination may be performed based on an RDO value of inter-frame geometry information or attribute information. The inter-frame relation determination (or search) may be performed by the context continuity determination/saving unit of FIG. 16 and the context continuity determination/saving unit of FIG. 18. The determination of inter-frame relation has been described above with reference to FIGS. 16 and 18, and thus a detailed description thereof will be omitted. When there is a reference frame related to the current frame among the previous frames, it may be determined that the encoding is performed by applying context continuity to the point cloud data of the current frame.

Frame encoding according to whether context continuity is applied as follows. When there is a reference frame related to the current frame among previous frames, context information (such as a probability range, a context model, or a probability model) about the reference frame is continuously used in encoding the current frame. The current frame may be encoded continuously in a probability range derived by arithmetic encoding of the reference frame, and may be encoded using a context model or a probability model used in arithmetic encoding of the reference frame. That is, the current frame may be encoded based on the context information about the reference frame, and context continuity is applied thereto.

In saving the context of a frame, context information (a probability range, a context model, or a probability model) derived in encoding the current frame is saved. The saved context information may be used in encoding another frame.

The frames according to the embodiments includes one of an I frame and a P frame. The I frame corresponds to the first frame in a group of frames (GoF), which is a set of multiple frames, and the P frame may be a frame predicted with reference to the I frame or another P frame. The frames according to the embodiments may or may not have a reference frame according to relation determination. When there is a reference frame, the current frame is a dependent frame, and context continuity is applied thereto. When there is no reference frame, the current frame may be an independent frame and may be encoded without applying context continuity thereto.

In the transmitting S2910 of the bitstream including the point cloud data, the bitstream may include index information representing the reference frame. The bitstream may further include index information representing the current frame and information about whether context continuity is applied. The index information representing the reference frame may be based on a distance from the first frame in the GoF to the reference frame. Alternatively, the index information representing the reference frame may be based on a distance from the current frame. The index information representing the reference frame may indicate a frame immediately preceding the current frame. The information about whether context continuity is applied represents whether the current frame is encoded based on the context of the reference frame.

Determining whether the context continuity of the frame is applied, encoding the frame based on the context of the reference frame according to whether there is a reference frame related to the frame, and saving the context of the frame may be performed by the point cloud data transmission device, the context continuity determination/saving unit, or the arithmetic coder described with reference to FIG. 16 or 18. Generation and delivery of the index information representing the current frame or the reference frame, the information about whether context continuity is applied, and the context information may be performed by the context continuity determination/saving unit described with reference to FIG. 16 or 18.

Figure 30:
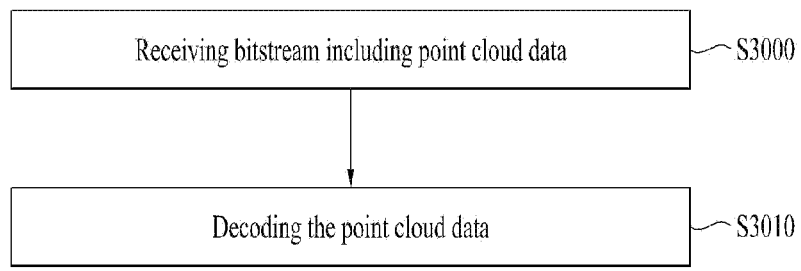
FIG. 30 illustrates a method of receiving point cloud data according to embodiments.

FIG. 30 illustrates a method of receiving point cloud data according to embodiments.

A method of receiving point cloud data according to the embodiments includes receiving a bitstream including point cloud data (S3000), decoding the point cloud data (S3010), and/or rendering the point cloud data. The operation S3010 of decoding the point cloud data includes decoding geometry information of the point cloud data and decoding attribute information of the point cloud data.

In the operation S3000 of receiving the bitstream including the point cloud data, the bitstream may include index information representing a reference frame. In addition, the bitstream may further include index information representing the current frame and information about whether context continuity is applied. The index information representing the reference frame may be specified based on a distance from the first frame in the GoF to the reference frame. Alternatively, the index information representing the reference frame may be specified based on a distance from the current frame to the reference frame. The index information representing the reference frame may indicate a frame immediately preceding the current frame.

In the operation S3010 of decoding the point cloud data, it is determined whether context continuity is applied to the frame of the point cloud data, and the frame is decoded based on the context of a reference frame related to the frame according to whether the context continuity is applied. In addition, in the operation S3010 of decoding the point cloud data, the context of the decoded frame may be saved.

Whether context continuity of the frame is applied may be determined based on information about whether context continuity is applied or whether there is a reference frame related to the current frame. The relation of the reference frame may be determined based on the frame type. The frame type may indicate any one of an I frame, a P frame, or a B frame. As for the relation, the relation between frames may be determined based on the types of the current frame and previous frames. The relation may be determined based on a difference in motion vector between the frames or based on an RDO value of inter-frame geometry information or attribute information. For the determination of the relation between the frames, a related description has been made with reference to FIG. 16, and thus redundant description will be omitted.

The frames according to the embodiments may include one of an I frame and a P frame. The I frame corresponds to the first frame in a group of frames (GoF), which is a set of multiple frames, and the P frame may be a frame predicted with reference to the I frame or another P frame. The frames according to the embodiments may or may not have a reference frame according to relation determination. When there is a reference frame, the current frame is a dependent frame, and context continuity is applied thereto. When there is no reference frame, the current frame may be an independent frame and may be decoded without applying context continuity thereto.

The reference frame related to the current frame may be identified by the index information representing the reference frame included in the bitstream. In addition, it may be determined whether context continuity is applied to the current frame through information representing whether context continuity is applied. When context continuity is applied or there is an index of the reference frame, the reception device according to the embodiments may recognize presence of the reference frame related to the current frame.

In the operation of decoding the frame based on the context of the reference frame according to whether context continuity is applied, when there is a reference frame among previous frames, the current frame is decoded using the context of the reference frame. The context of the reference frame may include at least one of a probability range, a context model, or a probability model. The context of the reference frame may be saved in the context continuity processor described with reference to FIG. 17 or 19.

Presence of the reference frame means that the current frame is encoded continuously using the context of the reference frame. Accordingly, the reception device according to the embodiments decodes the current frame based on the context information about the reference frame. Also, the reception device according to the embodiments may save context information about the current frame. The saved context information may be used in decoding other frames.

The point cloud data transmission device/reception device according to the embodiments, the point cloud transmission method/reception method, and the signaling method according to the embodiments may provide the following effects.

Embodiments may efficiently configure a bitstream by maximally removing redundant information using a context between frames with a high relation. Accordingly, the compression efficiency of the geometry information and the attribute information may be increased. By signaling the application range of each of the geometry and attribute, optimal compression efficiency may be achieved. In addition, since a probability model initialized for all frames is not used in encoding/decoding, the memory and the computing time may be reduced.

Point cloud data according to embodiments is captured through LiDAR equipment, and the method of partitioning the data into slides is supported such that the angular mode may be applied. Thereby, efficient geometry compression of 3D map data integrated into one piece of content may be implemented.

When point cloud data frames according to embodiments are integrated into one piece of point cloud content, a slide partitioning method may be provided for efficient geometry compression of Geometry-based Point Cloud Compression (G-PCC). Thereby, geometry compression coding/decoding efficiency may be increased.

The method/device for transmitting and receiving point cloud data according to the embodiments may more efficiently compress point cloud data based on the operation of dividing point cloud data captured by LiDAR equipment based on a 3D map and related signaling information.

Embodiments have been described from the method and/or device perspective, and descriptions of methods and devices may be applied so as to complement each other.

Although the accompanying drawings have been described separately for simplicity, it is possible to design new embodiments by merging the embodiments illustrated in the respective drawings. Designing a recording medium readable by a computer on which programs for executing the above-described embodiments are recorded as needed by those skilled in the art also falls within the scope of the appended claims and their equivalents. The devices and methods according to embodiments may not be limited by the configurations and methods of the embodiments described above. Various modifications can be made to the embodiments by selectively combining all or some of the embodiments. Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

Various elements of the devices of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the device according to the embodiments may include one or more processors capable of executing one or more programs. The one or more programs may perform any one or more of the operations/methods according to the embodiments or include instructions for performing the same. Executable instructions for performing the method/operations of the device according to the embodiments may be stored in a non-transitory CRM or other computer program products configured to be executed by one or more processors, or may be stored in a transitory CRM or other computer program products configured to be executed by one or more processors. In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

In this specification, the term "/" and "," should be interpreted as indicating "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C." Further, in this specification, the term "or" should be interpreted as indicating "and/or." For instance, the expression "A or B" may mean 1) only A, 2) only B, or 3) both A and B. In other words, the term "or" used in this document should be interpreted as indicating "additionally or alternatively."

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signals unless context clearly dictates otherwise.

The terms used to describe the embodiments are used for the purpose of describing specific embodiments, and are not intended to limit the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components. As used herein, conditional expressions such as "if" and "when" are not limited to an optional case and are intended to be interpreted, when a specific condition is satisfied, to perform the related operation or interpret the related definition according to the specific condition.

Operations according to the embodiments described in this specification may be performed by a transmission/reception device including a memory and/or a processor according to embodiments. The memory may store programs for processing/controlling the operations according to the embodiments, and the processor may control various operations described in this specification. The processor may be referred to as a controller or the like. In embodiments, operations may be performed by firmware, software, and/or a combination thereof. The firmware, software, and/or a combination thereof may be stored in the processor or the memory.

The operations according to the above-described embodiments may be performed by the transmission device and/or the reception device according to the embodiments. The transmission/reception device may include a transmission/reception unit configured to transmit or receive media data, a memory configured to store instructions (program code, algorithm, flowchart and/or data) for a process according to embodiments, and a processor configured to control operations of the transmission/reception device.

The processor may be referred to as a controller or the like, and may correspond to, for example, hardware, software, and/or a combination thereof. The operations according to the above-described embodiments may be performed by the processor. In addition, the processor may be implemented as an encoder/decoder or the like for the operations of the above-described embodiments.

Mode for Invention

As described above, related contents have been described in the best mode for carrying out the embodiments.

INDUSTRIAL APPLICABILITY

As described above, the embodiments may be fully or partially applied to the point cloud data transmission/reception device and system.

It will be apparent to those skilled in the art that variously changes or modifications can be made to the embodiments within the scope of the embodiments.

Thus, it is intended that the embodiments cover the modifications and variations of this disclosure provided they come within the scope of the appended claims and their equivalents.

What is claimed is:

1. A method of transmitting point cloud data, the method comprising:
encoding the point cloud data; and
transmitting a bitstream including the point cloud data,
wherein the encoding the point cloud data comprises:
determining whether context continuity is applied to the point cloud data in a data unit,
entropy encoding the point cloud data in the data unit based on context information of a previous data unit based on a determination that the context continuity is applied, and
entropy encoding the point cloud data in the data unit without the context information of the previous data unit based on a determination that the context continuity is not applied,
wherein the bitstream further includes signaling information that includes first information for identifying whether the context continuity is applied to the point cloud data in the data unit, second information for identifying the data unit and third information for identifying the previous data unit.

2. The method of claim 1, wherein the data unit is a dependent data unit related to the previous data unit.

3. The method of claim 1, wherein the encoding the point cloud data further includes:
saving context information of the data unit after entropy encoding the point cloud data in the data unit.

4. The method of claim 3, wherein the previous data unit related to the data unit is a reference data unit, and
wherein the reference data unit is searched based on a type of the previous data unit.

5. A device for transmitting point cloud data, the device comprising:
an encoder configured to encode the point cloud data; and
a transmitter configured to transmit a bitstream including the point cloud data;
wherein the encoder comprises:
a context continuity determination unit configured to determine whether context continuity is applied to the point cloud data in a data unit, and
an entropy encoder configured to entropy encode the point cloud data in the data unit based on context information of a previous data unit based on a determination that the context continuity is applied, and to entropy encode the point cloud data in the data unit without the context information of the previous data unit based on a determination that the context continuity is not applied,
wherein the bitstream further includes signaling information that includes first information for identifying whether the context continuity is applied to the point cloud data in the data unit, second information for identifying the data unit and third information for identifying the previous data unit.

6. The device of claim 5, wherein the data unit is a dependent data unit related to the previous data unit.

7. The device of claim 5, wherein the encoder is further configured to save context information of the data unit after entropy encoding the point cloud data in the data unit.

8. The device of claim 7, wherein the previous data unit related to the data unit is a reference data unit, and
wherein the reference data unit is searched based on a type of the previous data unit.

9. A method of receiving point cloud data, the method comprising:
receiving a bitstream including the point cloud data; and
decoding the point cloud data;
wherein the decoding the point cloud data comprises:
determining whether context continuity is applied to the point cloud data in a data unit,
entropy decoding the point cloud data in the data unit based on context information of a previous data unit based on a determination that the context continuity is applied, and
entropy decoding the point cloud data in the data unit without the context information of the previous data unit based on a determination that the context continuity is not applied,
wherein the bitstream further includes signaling information that includes first information for identifying whether the context continuity is applied to the point cloud data in the data unit, second information for identifying the data unit and third information for identifying the previous data unit.

10. The method of claim 9, wherein the data unit is a dependent data unit related to the previous data unit.

11. The method of claim 9, wherein the decoding the point cloud data further includes:

saving context information of the data unit after entropy decoding the point cloud data in the data unit.

12. The method of claim 11, wherein the previous data unit related to the data unit is a reference data unit, and wherein the reference data unit is searched based on a type of the previous data unit.

13. A device for receiving point cloud data, the device comprising:

a receiver configured to receive a bitstream including the point cloud data; and a decoder configured to decode the point cloud data; wherein the decoder comprises:

a context continuity determination unit configured to determine whether context continuity is applied to the point cloud data in a data unit, and an entropy decoder configured to entropy decode the point cloud data in the data unit based on context information of a previous data unit based on a determination that the context continuity is applied, and to entropy decoding the point cloud data in the data unit without the context information of the previous data unit based on a determination that the context continuity is not applied, wherein the bitstream further includes signaling information that includes first information for identifying whether the context continuity is applied to the point cloud data in the data unit, second information for identifying the data unit and third information for identifying the previous data unit.

14. The device of claim 13, wherein the data unit is a dependent data unit related to the previous data unit.

15. The device of claim 13, wherein the decoder is further configured to save context information of the data unit after entropy decoding the point cloud data in the data unit.

16. The device of claim 15, wherein the previous data unit related to the data unit is a reference data unit, and wherein the reference data unit is searched based on a type of the previous data unit.

* * * * *